US008560126B2

(12) United States Patent
Vass et al.

(10) Patent No.: US 8,560,126 B2
(45) Date of Patent: Oct. 15, 2013

(54) SETPOINT OPTIMIZATION FOR AIR HANDLING UNITS

(75) Inventors: Jiri Vass, Prague (CZ); Jiri Rojicek, Prague (CZ); Jana Trojanova, Usti nad Labem (CZ)

(73) Assignee: Honeywell International Inc., Morristown, NJ (US)

( * ) Notice: Subject to any disclaimer, the term of this patent is extended or adjusted under 35 U.S.C. 154(b) by 271 days.

(21) Appl. No.: 13/046,494

(22) Filed: Mar. 11, 2011

(65) Prior Publication Data

US 2012/0232702 A1 Sep. 13, 2012

(51) Int. Cl.
G01M 1/38 (2006.01)
G05B 13/00 (2006.01)
G05B 15/00 (2006.01)
G05D 23/00 (2006.01)

(52) U.S. Cl.
USPC ........... 700/277; 700/276; 700/278; 700/299; 700/300; 236/1 B; 236/1 C; 236/1 E; 236/44 C; 236/44 R

(58) Field of Classification Search
USPC .......... 700/276–278, 299–300; 236/1 B, 1 C, 236/1 E, 44 C, 44 R
See application file for complete search history.

(56) References Cited

U.S. PATENT DOCUMENTS

| 4,227,645 A | 10/1980 | de La Farge et al. |
| 4,567,939 A * | 2/1986 | Dumbeck ..................... 165/224 |
| 4,619,135 A * | 10/1986 | Nunn ............................... 73/1.71 |
| 4,873,649 A * | 10/1989 | Grald et al. .................... 700/276 |
| 5,105,366 A * | 4/1992 | Beckey ........................... 700/276 |
| 5,544,809 A * | 8/1996 | Keating et al. ................ 236/44 C |
| 5,924,486 A * | 7/1999 | Ehlers et al. .................. 165/238 |
| 7,778,734 B2 * | 8/2010 | Oswald et al. ................ 700/276 |
| 2004/0239494 A1 * | 12/2004 | Kennedy et al. ............. 340/500 |
| 2007/0005191 A1 * | 1/2007 | Sloup et al. ................... 700/276 |
| 2008/0177423 A1 * | 7/2008 | Brickfield et al. ............ 700/291 |
| 2008/0243657 A1 * | 10/2008 | Voysey ........................... 705/34 |
| 2009/0271154 A1 * | 10/2009 | Coad et al. ....................... 703/1 |
| 2010/0106674 A1 * | 4/2010 | McLean et al. ................ 706/52 |
| 2010/0332044 A1 * | 12/2010 | McLean ......................... 700/291 |
| 2012/0016638 A1 * | 1/2012 | McLean et al. .................. 703/1 |

OTHER PUBLICATIONS http://www.healthyheating.com/solutions.htm, Healthy Heating, "Discussion on the Thermal Comfort Calculator," 2 pages, printed prior to Mar. 11, 2011.
Advanced Environemental Concepts Pty Ltd, "Adaptive Thermal Comfort Report," Melbourne City Council, pp. 1-10, Mar. 24, 2003.
U.S. Appl. No. 13/046,456, 49 pages, Application filed Mar. 11, 2011.

\* cited by examiner

*Primary Examiner* — Ramesh Patel
(74) *Attorney, Agent, or Firm* — Seager Tufte & Wickhem LLC.

(57) ABSTRACT

An approach for providing setpoint optimization for air handling units. An area for such optimization may incorporate choosing a thermal comfort level index, finding a zone air properties target area and computing a supply air properties target area. Beyond the present approach, an outdoor air portion may be optimized, a feasible psychrometric path found, supply airflow versus temperature optimized, and a controller run to meet setpoints.

20 Claims, 23 Drawing Sheets

| PMV | % of dissatisfied |
|---|---|
| 0 | 5% |
| 0.5 | 10.2% |
| 0.84 | 19.9% |
| 0.9 | 22.1% |
| 1 | 26.1% |

*Figure 4A*

SETPOINT OPTIMIZATION FOR AIR HANDLING UNITS

BACKGROUND

The present disclosure pertains to heating, ventilation and air conditioning (HVAC) systems, and particularly to air handing units (AHUs). More particularly, the disclosure pertains to optimization of operation and energy consumption of air handling units.

SUMMARY

The disclosure reveals an approach for providing setpoint optimization for air handling units. An area for such optimization may incorporate choosing a thermal comfort level index, finding a zone air properties target area and computing a supply air properties target area. Beyond the present approach, an outdoor air portion may be optimized, a feasible psychrometric path found, supply airflow versus temperature optimized, and a controller run to meet setpoints.

BRIEF DESCRIPTION OF THE DRAWING

FIG. 4a is a diagram of a table showing a predicted mean vote (PMV) of various values of thermal comfort level and percentages of people dissatisfied, respectively, with each shown value of thermal comfort level;

DESCRIPTION

Figure 1:
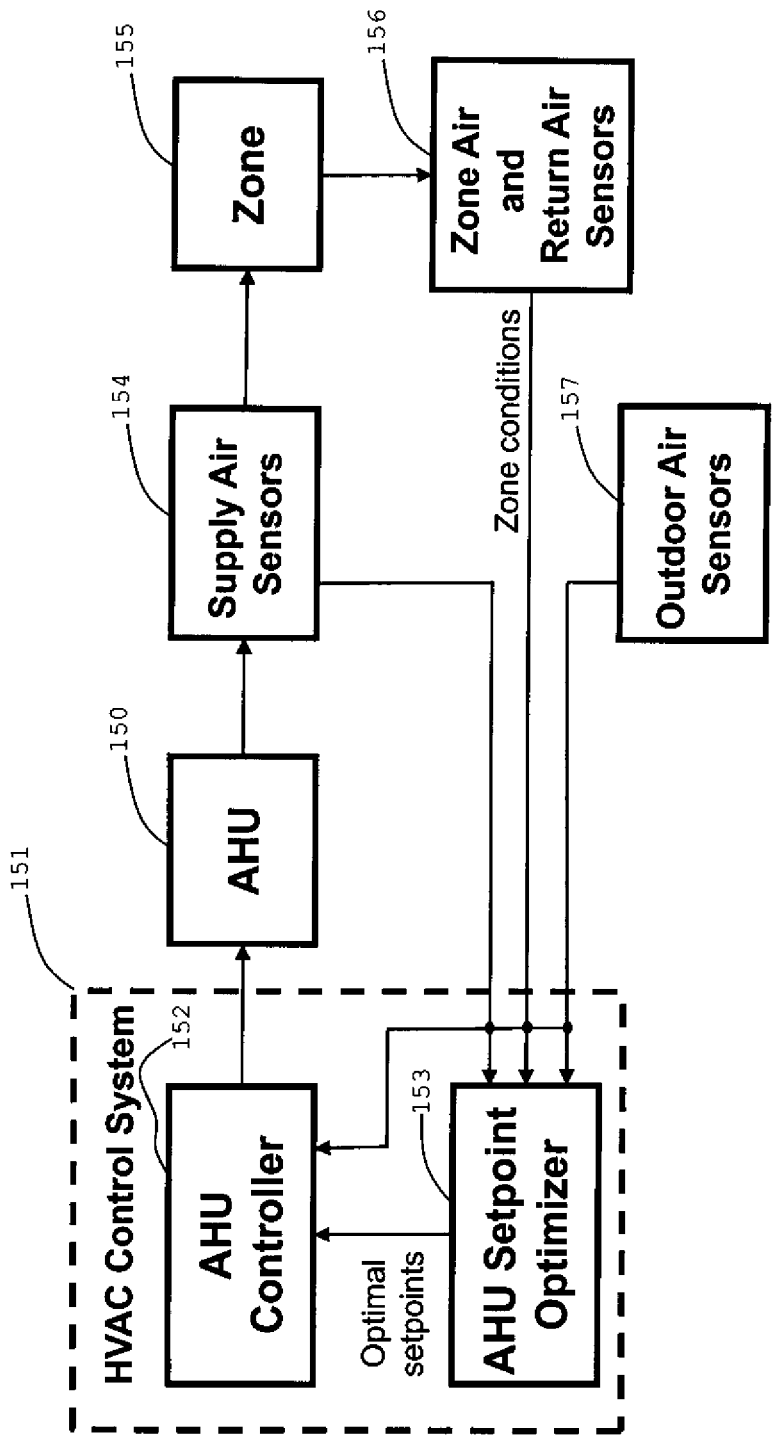
FIG. 1 is a diagram of a layout of an air handling unit and associated equipment.

The present application is related to U.S. patent application Ser. No. 13/046,456, filed Mar. 11, 2011, and entitled "Room Thermal Comfort Monitor", which is hereby incorporated by reference.

The present disclosure may concern control of air handling units (AHUs), a part of heating, ventilation and air conditioning (HVAC) systems in commercial and other buildings. A root cause of inefficient HVAC operation may typically be a poor choice of setpoints (for zone or supply air properties), or a poor control strategy to reach the chosen setpoints (e.g., the strategy may deliver the air of required properties, but may consume more energy than necessary). In many HVAC systems, setpoints may be defined only for air temperature (of zone air or supply air).

In specific world regions (e.g., with a humid climate), setpoints may also be defined for air relative humidity, and possibly defined for air speed. Therefore, one may use the term "air properties" to refer to one, two, three or more physical variables (depending on available sensors). An example set of variables may incorporate temperature only, temperature and relative humidity, or temperature, relative humidity and speed.

The present approach may be used to compute the supply air properties target area. The term "target area" may refer to a set of virtually all combinations of air properties (e.g., temperature, relative humidity and speed) that will lead to satisfaction of the occupants' requirements (concerning thermal comfort and indoor air quality). When a target area is used as a part of an AHU control strategy, energy consumed by HVAC equipment may be significantly reduced. When the term "comfort" is referred to herein, it means "thermal comfort", not necessarily other types of comfort, such as visual comfort (sufficient room illumination), air quality comfort (acceptable CO2 concentration), and so on.

The present disclosure may make use of a thermal comfort level index such as the PMV (predicted mean vote) to numerically quantify a room (or zone) thermal comfort level. The PMV may be regarded as one kind of an example thermal comfort index for enumerating comfort levels. Various amounts or degrees of zone comfort may be measured and labeled in accordance by an index quantitatively or qualitatively. Such an index may be regarded as thermal index, thermal comfort index, a comfort index or another type of index. The present disclosure is not necessarily linked to any specific thermal comfort index. The PMV may be a thermal sensation index (e.g., a real number between −3 and +3), whose value near zero corresponds to "comfortable", while −3 and +3 correspond to "very cold" and "very hot", respectively. The present disclosure may differ from a classical solution by a) achieving a desired room thermal comfort level by using different combinations of air properties, b) taking into account the factors that affect the room thermal comfort level (e.g., occupation, internal heat gain, weather, and so on), and c) combining several concepts (e.g., PMV, supply air reset, and outdoor air correction) in a way to compute a supply air properties target area.

The present disclosure may describe a computer algorithm that involves three main steps: 1) choose an optimal PMV setpoint; 2) compute a zone air properties target area; and 3) compute a supply air properties target area.

In step 1, a PMV setpoint (a real number between, e.g., −0.8 and +0.8) may be defined using a PMV scheduler that takes into account the geographical location (of a given building), current season (e.g., summer, winter, spring), room type (e.g., office, gym, ballroom), and so forth. Optionally, the PMV setpoint may be adjusted based on an occupant's input (PMV offset).

In step 2, the PMV space may be computed for a given range of zone air properties and occupant-related parameters (i.e., activity level, clothing insulation, and so forth). Then, the zone air properties target area may be determined as a subset of the PMV space that consists of points satisfying the given PMV setpoint (chosen in step 1). The zone air properties target area may be a 2D plane (in a temperature/humidity plane, or a temperature/speed plane) or a 3D subspace (in a temperature/humidity/speed space).

In step 3, the supply air properties target area may be computed by transforming the zone air properties target area using various reset approaches, including a supply air temperature reset, supply air humidity reset, and various corrections based on an internal heat gain (depending on current occupancy), building dynamics, current weather (i.e., outdoor air conditions) and/or weather forecast.

The present approach may provide information that can be used as a part of an advanced control strategy for air handling units. For example, the output of this approach (i.e., supply air properties target area) may be used as an input to an optimization algorithm searching for supply air setpoints (i.e., temperature, humidity and air flow speed). Specifically, the supply air setpoint may be chosen as a particular point (from the supply air properties target area) which appears presently to be the most economical (i.e., yields the highest energy savings).

Therefore, the present approach may be incorporated into a broader optimization approach that involves the following steps: 1) compute the supply air properties target area (as addressed by this approach); 2) define minimal portion of outdoor air (based on regulations, demand-controlled ventilation, and so forth); 3) search for the least expensive feasible path in the psychrometric chart, i.e., find the best "start point" (optimal portion of outdoor air) and the best "end point" (supply air setpoint); 4) define the required air massflow (or supply air static pressure); and 5) run a PID (or similar) controller to meet the computed setpoints incorporating a supply air temperature setpoint, a supply air flow speed setpoint (optional), and a supply air relative humidity setpoint (optional). One may note that a complete solution (for reducing AHU energy consumption) may be a control strategy with steps 1 to 5.

To review, an HVAC system may consist of a heating plant, a cooling plant and a ventilation system. The heating plant may have water or steam boilers. The cooling plant may have absorption or compressor chillers. The ventilation system may have air handling units (AHUs), terminal units and fan coils.

A purpose of an AHU is to guarantee that room occupants receive a satisfactory level of 1) thermal comfort and 2) indoor air quality (IAQ). Thermal comfort may typically be quantified by zone air temperature. Thermal comfort may be optionally quantified also by zone air humidity and/or zone air speed. Indoor air quality (IAQ) may be quantified by noting a concentration of carbon dioxide ($CO_2$), volatile organic components (VOCs), and so forth.

Some approaches of AHU control may often result in inefficient operation and high energy consumption by HVAC equipment, thus causing significant financial losses to a building owner of a building having HVAC equipment (i.e., unnecessary consumption of electricity and fuel), as well as contributing to an environmental impact (e.g., greenhouse gas and $CO_2$ emissions) of commercial and residential buildings.

A computer/controller (computer) 40 may enable or be a part of a portion or a whole of the setpoint optimization for air handling units system and approach disclosed herein. Computer 40 may incorporate one or more inputs, a processor, a user interface with a keyboard and display, a memory, external connections such as an internet, one or more outputs, and so forth. Computer 40 may be utilized or associated with virtually any item shown in and/or pertinent to FIGS. 1-21 and the present disclosure.

Setpoint optimization of an AHU may be an objective of the present approach. FIG. 1 is a diagram of a layout of an AHU 150 and associated equipment. A portion 151 of an HVAC control system may have an AHU controller 152 connected to AHU 150, and an AHU setpoint optimizer 153 connected to AHU controller 152. Optimizer 153 may provide optimal setpoints to AHU controller 152. AHU 150 may be connected to supply air sensors 154. Supply air sensors 154 may be connected to AHU setpoint optimizer 153 and to AHU controller 152. Supply air sensors may also be connected to a zone 155. A zone 155 may be connected to zone air and return air sensors 156. Zone air and return air sensors may be connected to AHU setpoint optimizer 153 and to AHU controller 152. Zone air and return air sensors 156 may provide zone conditions to AHU setpoint optimizer 153 and AHU controller 152. Outdoor air sensors 157 may be connected to AHU setpoint optimizer 153 and AHU controller 152. The present approach may concern, at least in part, the AHU setpoint optimizer.

AHU control may address thermal comfort (temperature, relative humidity, and/or zone air speed), indoor air quality (levels of $CO_2$, VOCs and so forth). A requested or desired thermal comfort level should be achieved with minimal energy consumption. Thermal comfort level and energy consumption may be in tension relative to each other. Heating, cooling and fans, of course, may consume undesirably substantial amounts of energy for good thermal comfort levels.

Assuming a standard AHU 150 configuration, the variables that may be controlled consist of an outdoor air portion, supply air temperature, supply air relative humidity and supply air flow speed. A PI (proportional integral) controller may be sufficient to control a system. A task may be to define (better) setpoints.

Figure 2:
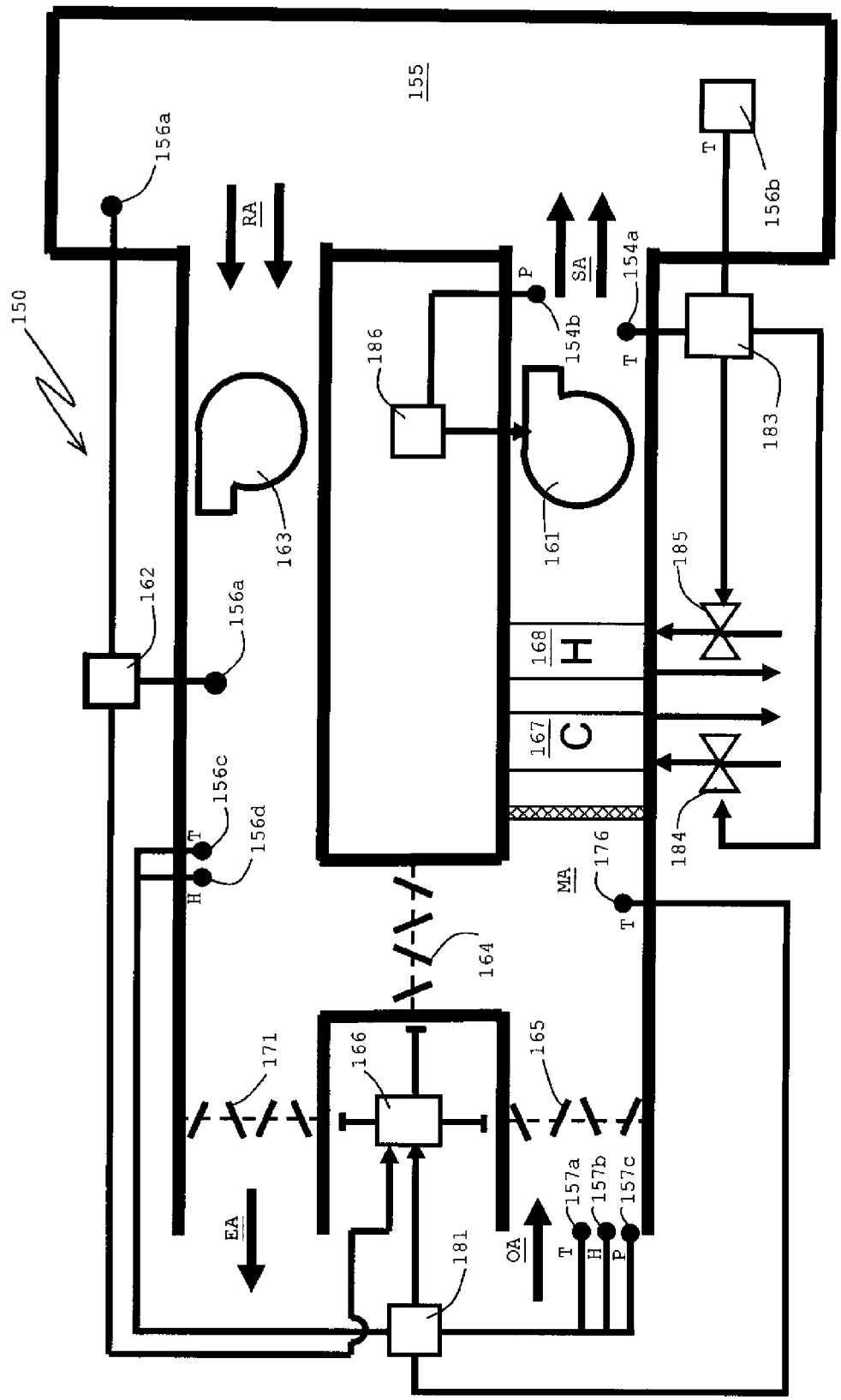
FIG. 2 is a diagram of an air handling unit.

FIG. 2 is an overview of an AHU 150. Supply air (SA) may be provided to a zone by a fan 161 to a zone 155. Return air (RA) may leave zone 155 and go to two places. Some of the return air may be moved out of zone 155 as return air (RA) by a fan 163. Fan 163 may be positioned in the return air duct. Some of the return air may go through a damper 164 to be mixed or not be mixed with outdoor air (OA) drawn in through a damper 165. The combination of return air and outdoor air may be mixed air (MA). Dampers 164 and 165 may be controlled so that if, for example, 20 percent of the return air is exhaust air, then the 20 percent lack of return air is replaced by an equivalent amount of outdoor air. If no return air is exhausted, then damper 164 may be completely open and damper 165 may be completely closed. If all of the return air is exhausted, then outdoor air may replace 100 percent of the return air, in that damper 164 may be completely closed and damper 165 may be completely open. Control mechanism 166 may regulate dampers 164, 165 and 171 so that the appropriate amounts of return air and outdoor air are combined as the mixed air. The mixed air may be drawn past a cooling coil 167 and a heating coil 168, for cooling or heating, respectively, by fan 161, and be provided as supply air to zone 155.

A CO2 sensor 156a may be placed in zone 155 and/or in a return air duct for determining an amount of CO2 in the zone or return air, respectively. A CO2 sensor 156a output signal may go to mechanism 162 which may provide adjustment signals to mechanism 166 for determining what percent of outdoor air should make up the mixed air.

A temperature sensor 156c and a humidity sensor 156d may be situated in the return air (RA) duct to detect air temperature and relative humidity of the return air. A temperature sensor 157a, humidity sensor 157b, and pressure sensor 157c may be situated at an entry of an outdoor air (OA) duct to detect air temperature and relative humidity of the outdoor air that might enter the AHU 150 system. A temperature sensor 176 may be positioned in a mixed air duct to detect air temperature of the mixed air (MA). A temperature sensor 154a may be positioned in a supply air (SA) duct to detect air temperature of the supply air. Also in the supply air duct may be a pressure sensor 154b for detecting the static pressure of the air in the supply duct.

Outputs from sensors 156c, 156d, 157a, 157b, 157c and 176 may be provided to an enthalpy economizer 181. The enthalpy economizer 181 may be connected to mechanism 166 which can control the position of the exhaust air damper 171, return air damper 164 and outdoor air damper 165.

Zone air temperature of sensor 156b and supply air temperature from sensor 154a may go to an air temperature control 183. In case that sensor 156b is not installed, return air temperature of sensor 156c may be used as an estimate of zone air temperature. Control 183 may be connected to valves 184 and 185 to let cold fluid into the cooling coil 167 or let hot fluid into the heating coil 168, respectively, in order to provide supply air at a temperature as set at the air temperature control 183.

A variable speed control mechanism 186 may receive a supply duct static pressure indication so as to variably control a speed of the supply air fan 161 to maintain the supply duct pressure at sensor 154b as set at the variable speed control 186.

Figure 3:
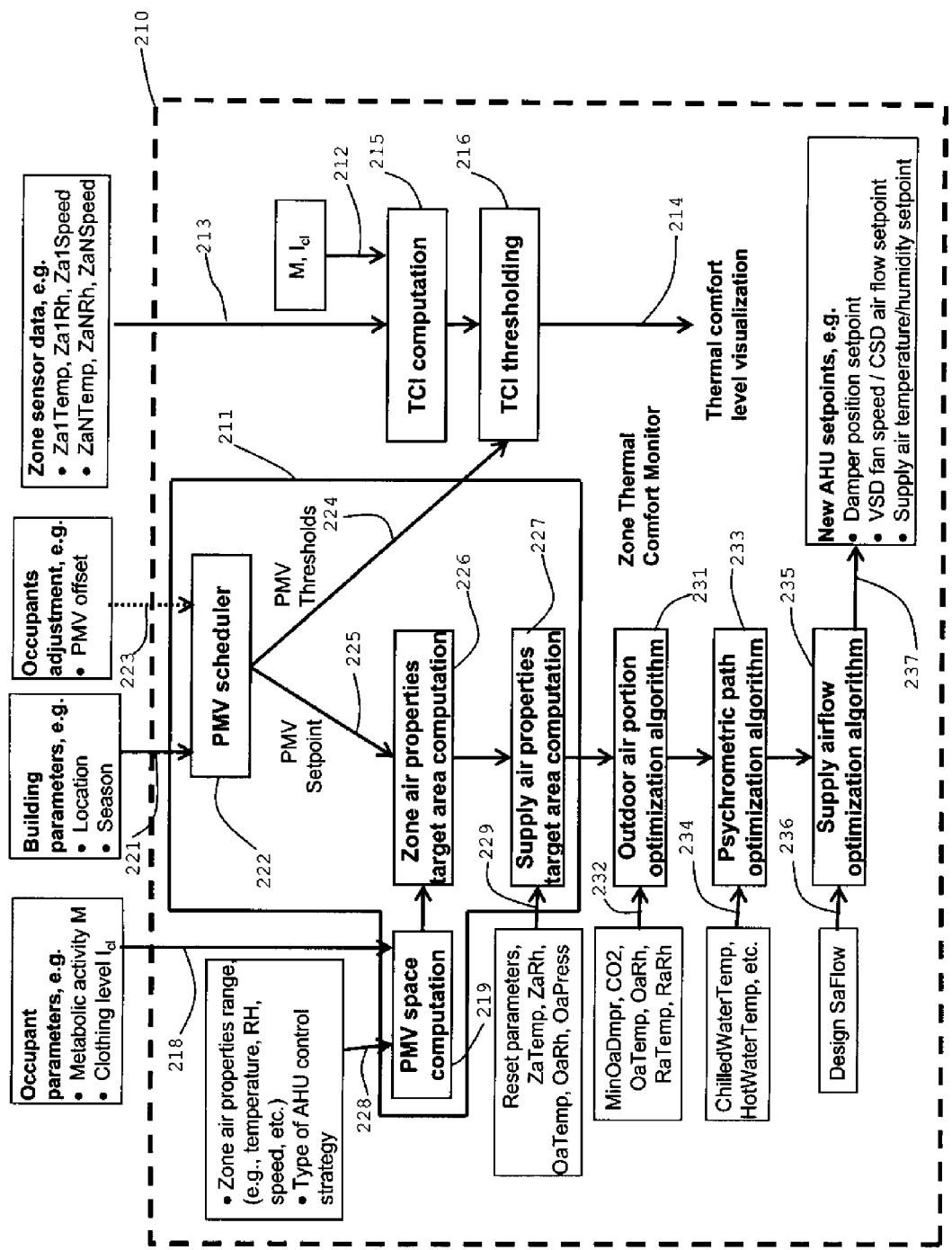
FIG. 3 is a diagram of a high-level approach for an air handling unit control, monitor and setpoint optimizer.

FIG. 3 is a diagram of a high-level approach for an AHU control, monitor and setpoint optimizer. An input 212 may incorporate M (metabolic activity) and $I_{cl}$ (clothing level) which are occupant parameters. Also incorporated are zone sensor data such as Za1Temp, Za1Rh and Za1Speed (air temperature, air relative humidity and air speed, respectively, from zone 1), ZaNTemp, ZaNRh and ZaNSpeed (air temperature, air relative humidity and air speed, respectively, from zone N) at an input 213. An output 214 from symbol 216 may be a thermal comfort level visualization. The zone sensor data may go to a TCI (thermal comfort index) computation at symbol 215. A computed TCI may go to a TCI thresholding at symbol 216. Then the output of symbol 216 may be the output 214 of the zone thermal comfort monitoring portion.

Another portion of AHU control may have occupant parameters (M and $I_{cl}$) as an input 218 to PMV space computation represented by symbol 219. A zone air properties range (temperature, relative humidity (RH) and speed) along with a type of AHU control strategy may be an input 228 to PMV space computation at symbol 219.

Portion 211 may be of particular interest in the present approach. Building parameters such as location and season may be of an input 221 to a PMV scheduler at symbol 222. An occupant's adjustment such as a PMV offset (scalar value of e.g. 0.3) may be an input 223 to the PMV scheduler. The PMV scheduler at symbol 222 may provide an output 224 of PMV thresholds to the TCI thresholding at symbol 216. A PMV setpoint output 225 may go to a zone air properties target area computation at symbol 226. Also an input from PMV space computation at symbol 219 may go to the zone air properties target area computation at symbol 226. An output from the zone air properties target area computation at symbol 226 may go as an input to supply air properties target area computation at symbol 227. Supply air reset parameters (e.g. minimum and maximum supply air temperature setpoint, reset line slope, . . . ), ZaTemp (zone air temperature), ZaRh (zone air relative humidity), OaTemp (outdoor air temperature) OaRh (outdoor air relative humidity) and OaPress (outdoor air barometric pressure), may be an input 229 to the supply air properties target area computation at symbol 227. An output from the supply air properties target area computation may go as an input to an outdoor air portion optimization algorithm at symbol 231. Also an input 232 of MinOaDmpr (minimum outdoor air damper position), CO2 (carbon dioxide concentration), OaTemp (outdoor air temperature), OaRh (outdoor air relative humidity), RaTemp (return air temperature) and RaRh (return air relative humidity) may go to the outdoor air portion optimization algorithm. An output from outdoor air portion optimization algorithm at symbol 231 may go to a psychrometric path optimization algorithm at a symbol 233. A chilled water supply temperature, chilled water return temperature, hot water supply temperature, hot water return temperature and so forth may go as an input 234 to the psychrometric path optimization algorithm. An output from psychrometric path optimization algorithm at symbol 233 may go to a supply air flow speed optimization algorithm at symbol 235. An input 236 of a SaFlow dsgn (design supply air flow) may go to the supply air flow speed optimization algorithm. An output 237 from the supply air flow speed optimization algorithm at symbol 235 may have new setpoints such as damper position setpoint, VSD (variable speed drive) fan speed setpoint, CSD (constant speed drive) air flow setpoint, supply air temperature setpoint and/or supply air relative humidity setpoint.

A zone thermal comfort level may be numerically quantified using the PMV (predicted mean vote). The PMV may be equated to a thermal sensation index (which may be very commonly adopted). The PMV may be a number between −3 (very cold) and +3 (very hot). If the PMV is between −0.84 and +0.84, then about 80 percent of the people may be considered as being satisfied (per Chapter 8 "Thermal Comfort" from "ASHRAE Handbook—Fundamentals", 2005, American Society of Heating, Refrigerating and Air-Conditioning Engineers, Inc. (ASHRAE), ISBN 1-931862-71-0.) with their thermal comfort level. FIG. 4a is a table 247 showing a PMV of 0, 0.5, 0.84, 0.9 and 1 with the percentages of 5, 10.2, 19.9, 22.1 and 26.1 of people being dissatisfied, respectively, with their thermal comfort level.

The PMV may be computed using factors which incorporate air temperature, air relative humidity, air speed, mean radiant temperature, metabolic rate and clothing level. Data points (i.e., sensor data) may incorporate air temperature, air relative humidity, air speed and mean radiant temperature. Parameters (depending on room type and season) may incorporate a metabolic rate and clothing level of occupants.

Figure 4B:
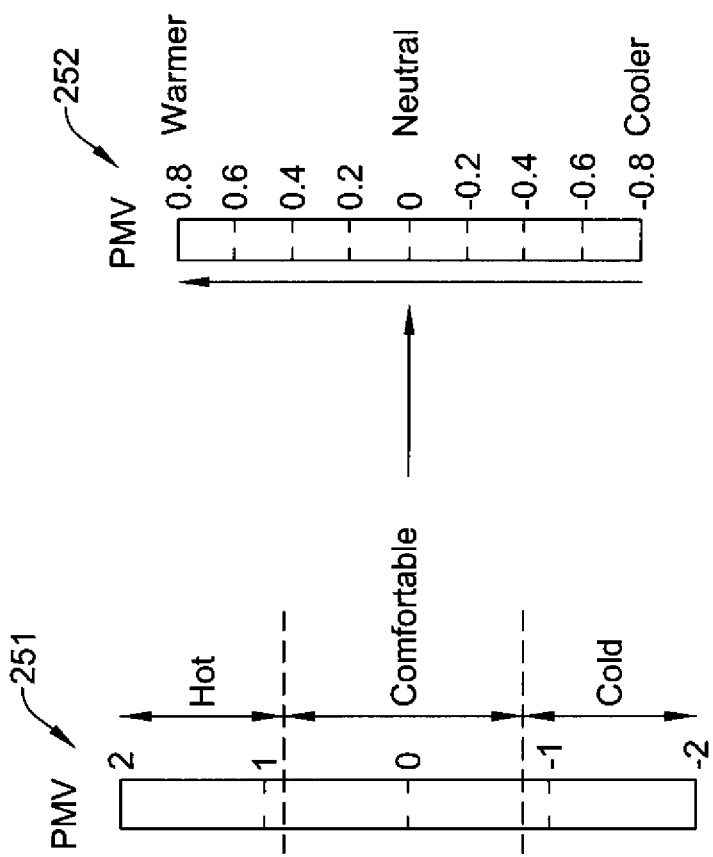
FIG. 4b is a diagram showing a predicted mean vote bar graph indicating numerical values for thermal comfort levels between hot and cold.

FIG. 4b is a diagram 251 showing the PMV of a range from +2 (hot) to −2 (cold). The comfortable range may be from −0.84 to +0.84. Diagram 252 of FIG. 4b is a zoomed in view of the PMV comfortable range from 0.8 (warmer) to −0.8 (cooler). Zero may be regarded as neutral. Even when the PMV is inside the comfortable range, one may fine-tune the PMV value to save energy.

An AHU optimization approach may incorporate the following which may be indicated as part of the AHU control strategy. The area for setpoint optimization may be defined. First, a PMV setpoint may be chosen. Geographical location, season, occupants' adjustment (e.g., PMV offset) and the like may be considered. Second, a zone air properties target area may be found. The PMV space may be computed. Points (e.g., combinations of air temperature, air relative humidity and/or air speed) satisfying the PMV setpoint may be located. Third, the supply air properties target area may be computed. The zone air properties target area may be transformed into the supply air properties target area. Items considered in the computation may incorporate a supply air temperature reset, a supply air humidity reset, building dynamics, occupancy, weather, weather forecast and so on.

The outdoor air portion may be optimized. First, the minimum portion of outdoor air may be defined. The defining may incorporate a result in regulations, demand-controlled ventilation, and so forth. Second, an optimal portion of outdoor air may be found, which may involve a search for an optimal mixing ratio (of the outdoor air and return air), while taking into account the heat recovery equipment (e.g., economizer, recuperation wheel). A feasible psychrometric path may be found. The supply air flow speed versus temperature may be optimized. A controller may be run to meet the setpoints.

Figure 5:
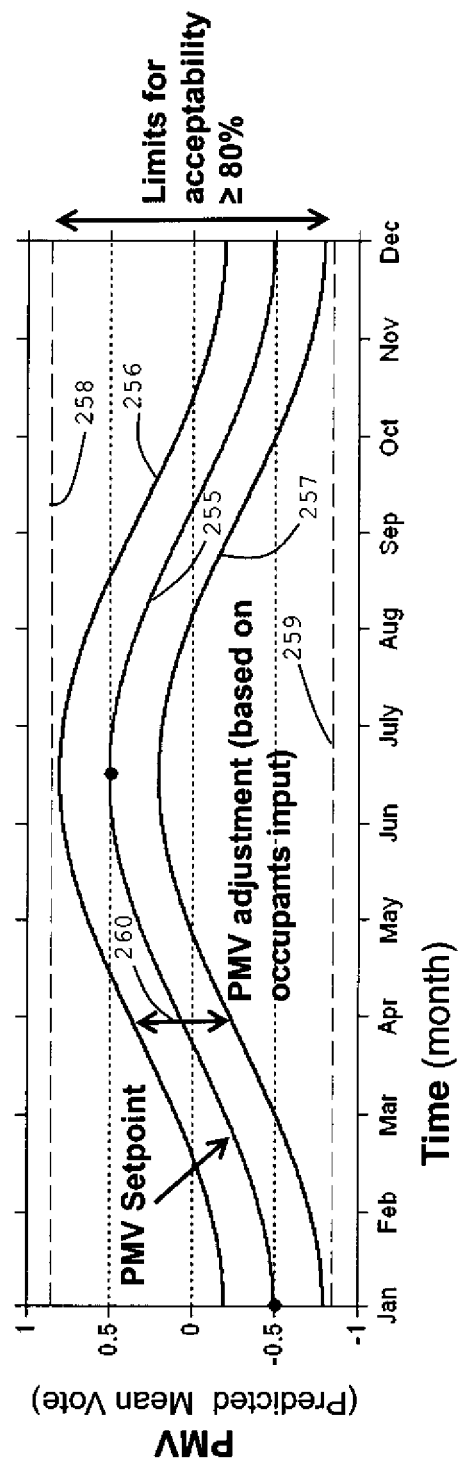
FIG. 5 is a graph of an example predictive mean vote plot versus month for a given city.

The first step of the present approach may be to choose a PMV setpoint. FIG. 5 is a graph which may be used in choosing the PMV setpoint. For example, the Figure may be used by the PMV scheduler 222 to choose the PMV setpoint 225. Also, the Figure is a graph of example PMV plots for Prague, CZ. Curve 255 is of PMV setpoints for a year duration. The range of curve 255 may be from −0.5 to +0.5. Curve 256 is the high side of the range of the PMV and curve 257 is the low side of the PMV. Curves 256 and 257 may provide a basis or spread 260 for PMV setpoint adjustment, which may be based on occupants' inputs (e.g., PMV offset). The limits for acceptability amount to equal to or greater than 80 percent of the occupants as indicated by lines 258 and 259.

A first part of the second step is to compute the PMV space. The computation may be done offline. A key parameter may be of a metabolic activity level which can depend on room type. Another key parameter may be clothing insulation level which can depend on the season.

Figure 6:
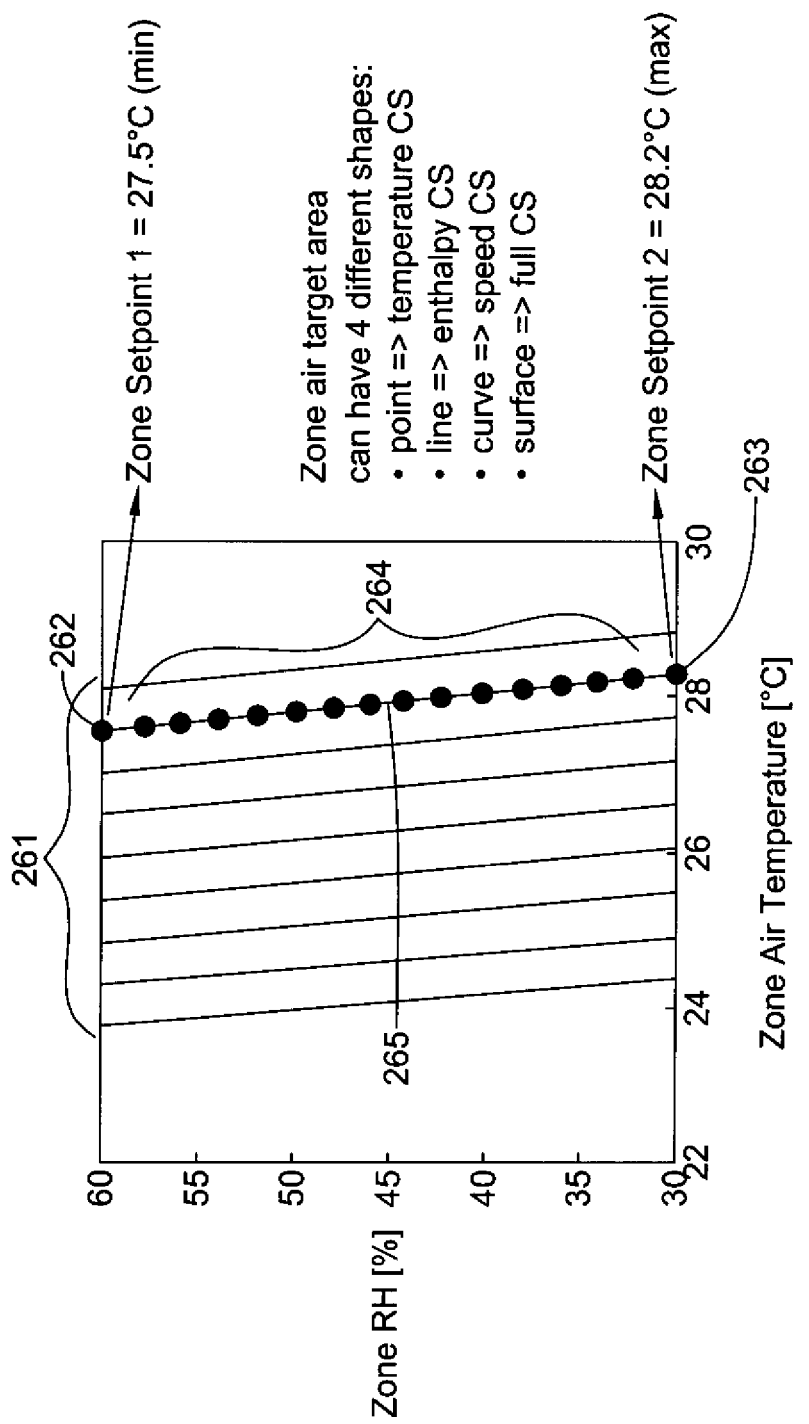
FIG. 6 is a graph of relative humidity versus zone air temperature with setpoints along a predicted mean vote for a zone air properties target area.

A second part of the second step of the present approach may be to find a zone air properties target area. Virtually all of the points may need to satisfy a given PMV setpoint. A minimum/maximum temperature may define the zone temperature setpoint. FIG. 6 is a graph of zone relative humidity (percent) versus zone air temperature (degrees C.). Lines 261 correspond to various PMV values. For a given PMV setpoint 265, a zone setpoint 1 at dot 262 may be 27.5 degrees C. (minimal acceptable zone temperature) and 60% (maximal desirable zone relative humidity), and a zone setpoint 2 at dot 263 may be 28.2 degrees C. (maximal desirable zone temperature) and 30% (minimal desirable zone relative humidity). Dots 264 between dot 262 (minimal temperature, maximal humidity) and dot 263 (maximal temperature, minimal humidity) on the same PMV line 265 may indicate the zone air properties target area. The zone air properties target area may have several different shapes. It may be a point in case of temperature-based control strategy (TCS), a line in case of enthalpy-based control strategy (ECS), a curve in case of speed-based control strategy (SCS) and/or a surface in case of the full control strategy (FCS) optimizing all air properties related to thermal comfort, i.e. temperature, relative humidity and speed.

Figure 7A:
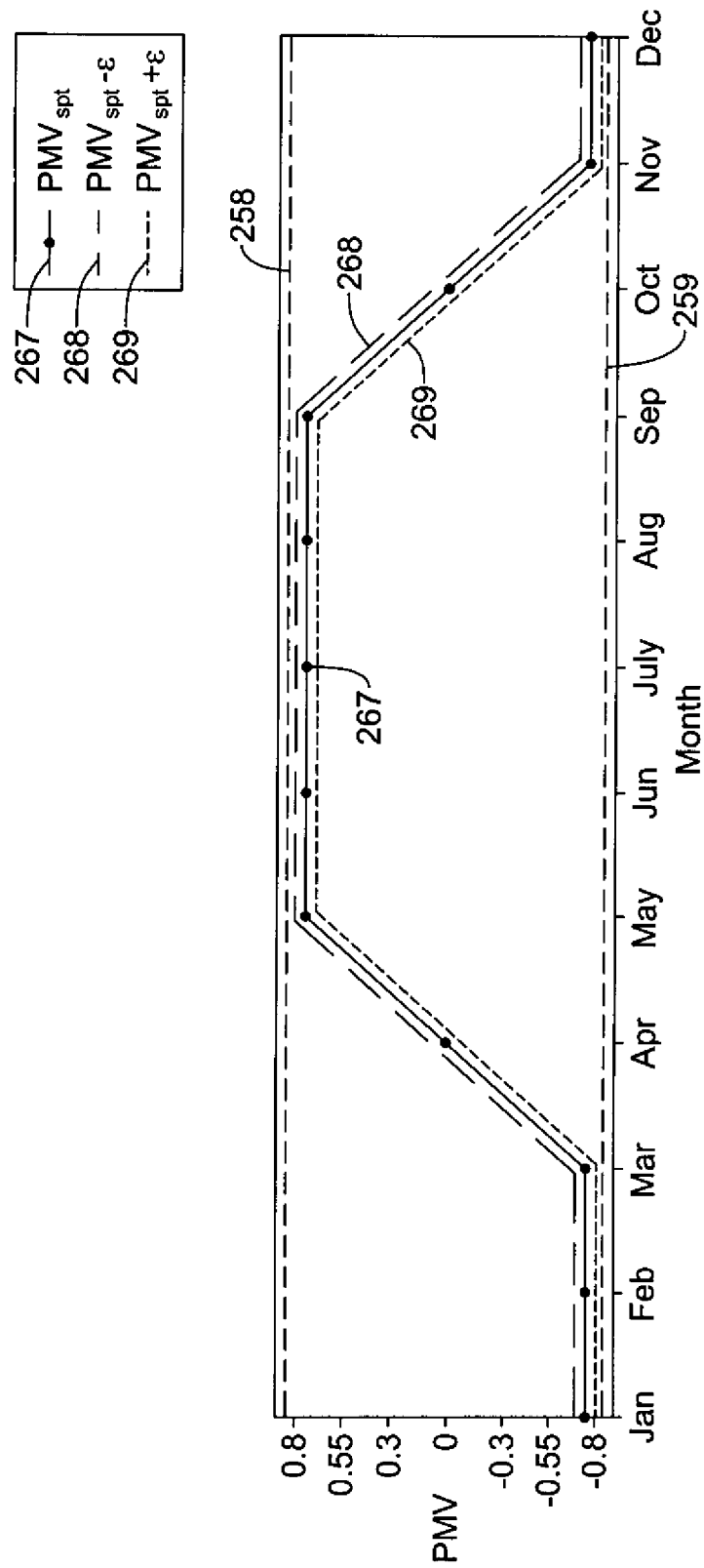
FIG. 7a is an example graph of predicted mean vote versus month durations for Prague.
Figure 7B:
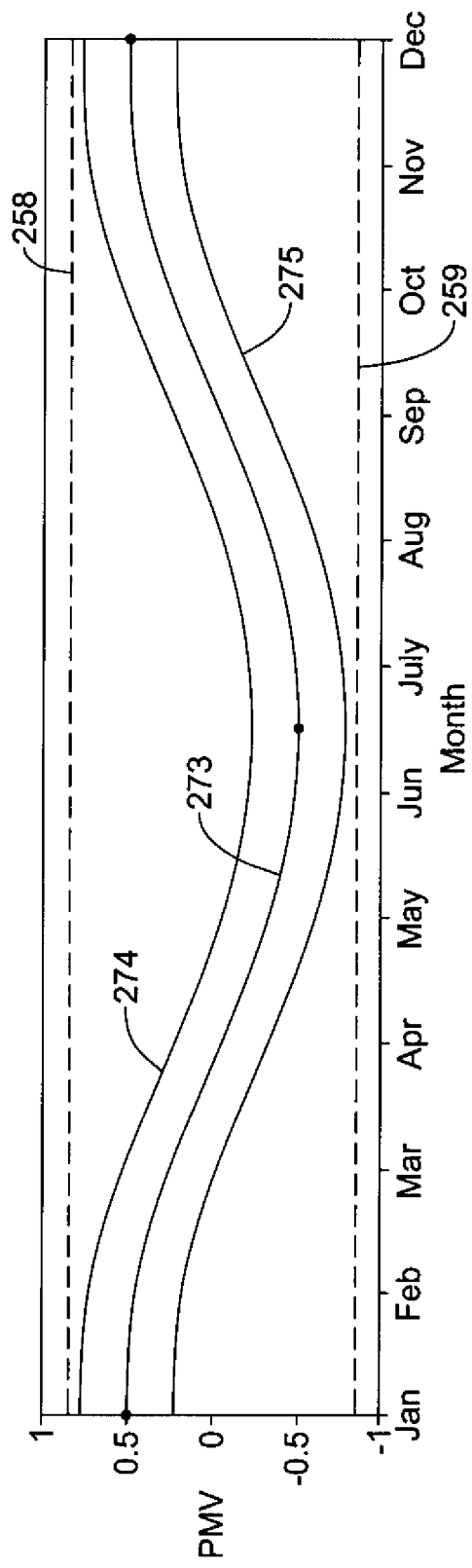
FIG. 7b is an example graph of predicted mean vote versus month durations for Brisbane.

The first and second steps of the present approach may be described more specifically. The PMV setpoint may be chosen in the first step. A PMV scheduler 222 may provide a PMV setpoint for a given location and season. The PMV scheduler may be for a region specific such as, for example, Prague versus Brisbane. FIG. 7a shows a graph of PMV versus month durations for Prague. Curve 267 may represent $PMV_{spt}$ (PMV setpoint). Curve 268 may represent $PMV_{spt}+\epsilon$ (plus adjustment) and curve 269 may represent $PMV_{spt}-\epsilon$ (minus adjustment). Adjustment $\epsilon$ may be derived from PMV offset. Curves 268 and 269 may represent a PMV adjustment based on occupants' inputs (e.g., PMV offset). Lines 258 and 259 may represent the limits of PMV acceptability by ≥80 percent of the occupants. FIG. 7b shows a graph of PMV versus month durations for Brisbane. Curve 273 may represent the $PMV_{spt}$. Curve 274 may represent $PMV_{spt}+\epsilon$ and curve 275 may represent $PMV_{spt}-\epsilon$. Curves 274 and 275 may represent a PMV adjustment based on occupants' inputs. Lines 258 and 259 may represent the limits of PMV acceptability by 80 percent of the occupants. The curves may take various shapes such as triangular, sinusoidal, and so on. The graphs may provide setpoint definition. Optimally, the PMV setpoint may be adjusted based on occupants' inputs (e.g., offset, bandwidth, or the like).

Figure 8:
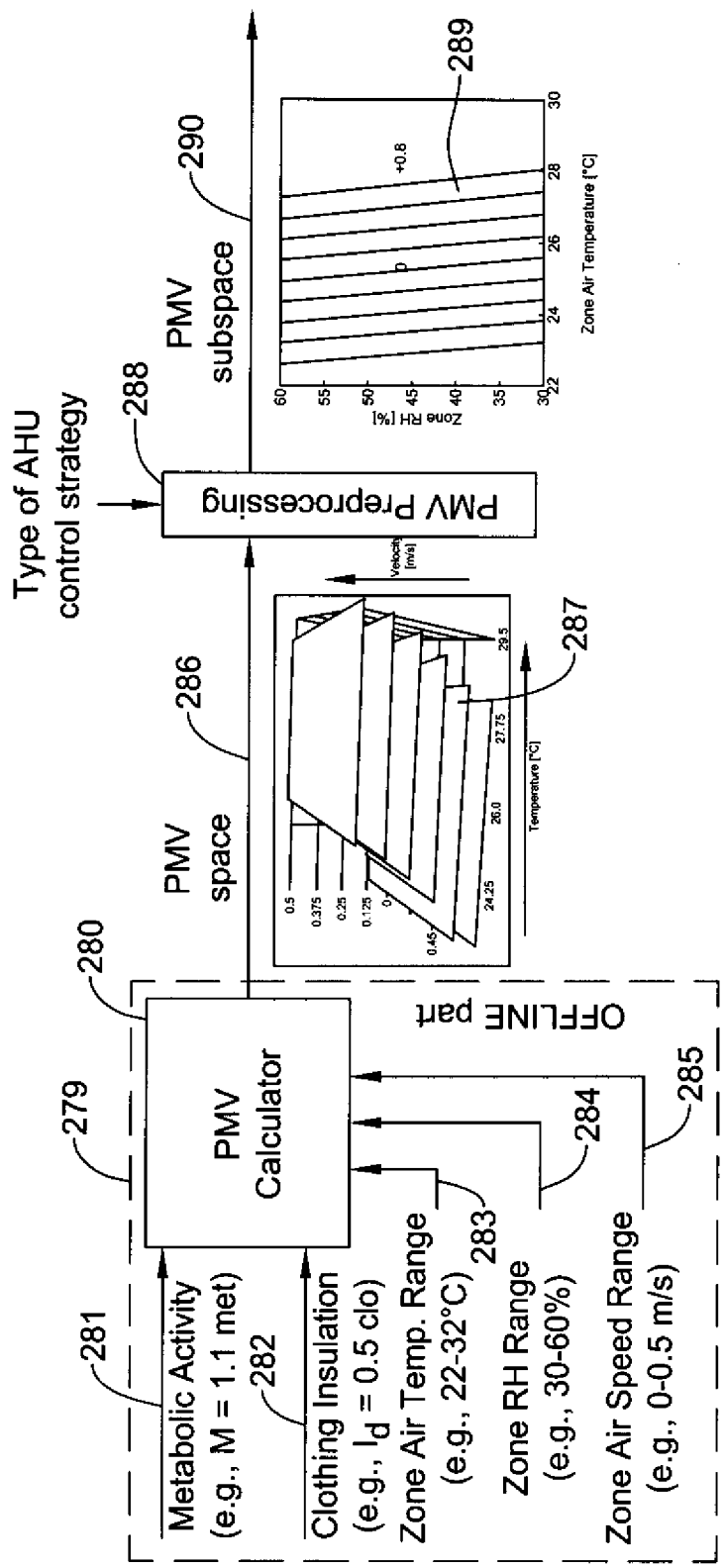
FIG. 8 is a diagram of calculator for a predicted mean vote space and subspace.

FIG. 8 is a diagram which may illustrate the first part of the second step of the present approach. This part of the step may be computing a PMV space graph 287. The computing may take place within symbol 279, which may incorporate a PMV calculator 280 and inputs to the calculator. Symbol 279 may represent PMV space computation at symbol 219 of FIG. 3. Symbol 279 may represent an offline part that incorporates calculator 280, and provides inputs to the calculator. One input 281 may consist of a metabolic activity level input, for example, M=1.1 met. Another input 282 may consist of clothing insulation, for example, $I_{cl}$=0.5 clo. A third input 283 may consist of a zone air temperature range, for example, 22 degrees C. to 32 degrees C. A fourth input 284 may consists of a zone relative humidity range, for example, 30 percent to 60 percent. A fifth input 285 may consist of a zone air speed range, for example, zero to 0.5 m/s.

An output 286 from calculator 280 may be a PMV space graph 287. Then the output 286 may go to a PMV preprocessing part 288 which selects a specific portion (subspace) of the PMV space depending on the type of AHU control strategy (TCS, ECS, SCS or FCS). The next stage of the output 286 may be a resultant PMV subspace 290 as represented by a graph 289. PMV subspace may be identical to PMV space under specific circumstances, e.g., in case of AHU control strategy being FCS (full control strategy).

Figure 9:
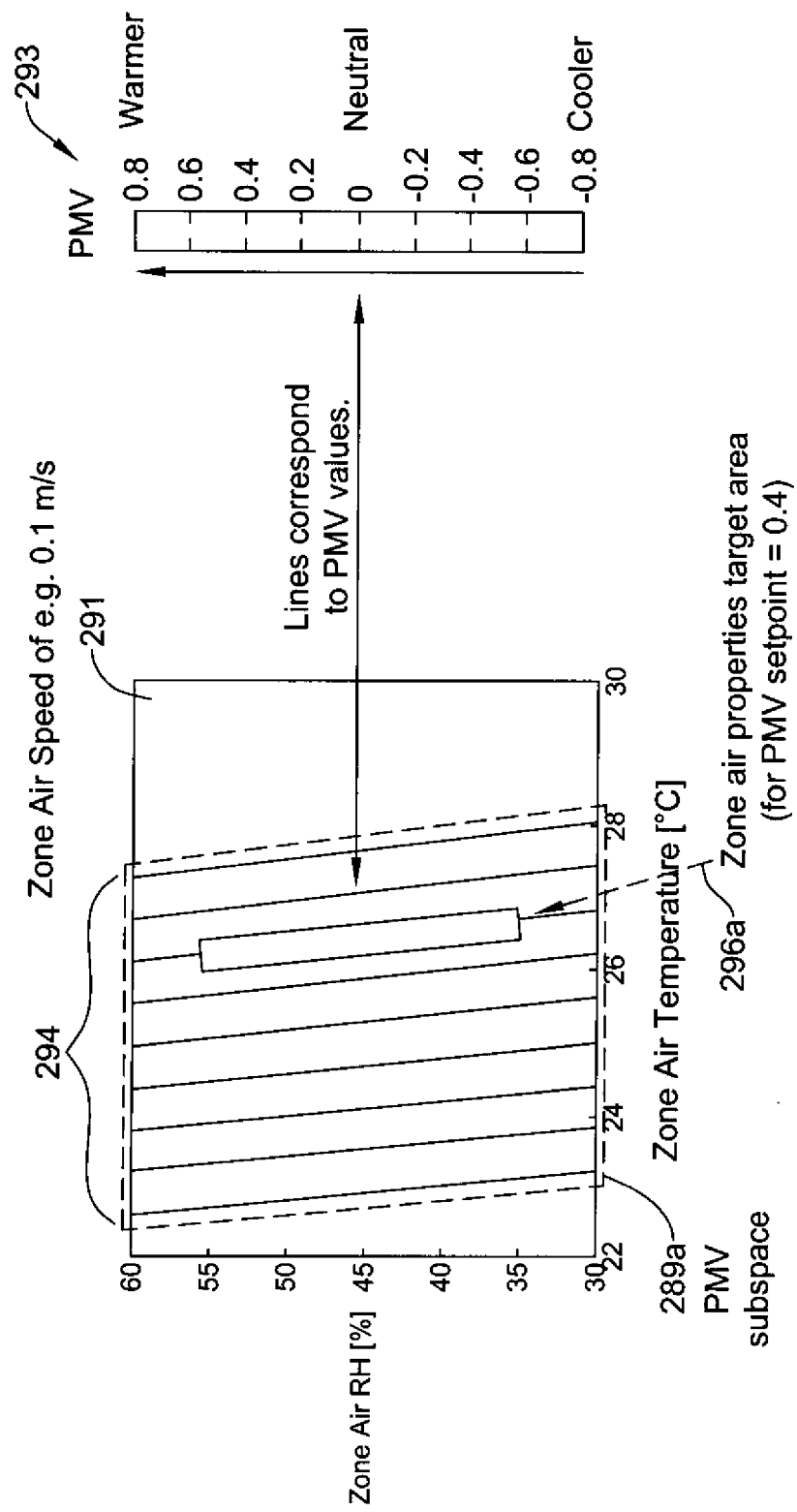
FIG. 9 shows a graph indicating an enthalpy-based strategy.
Figure 10:
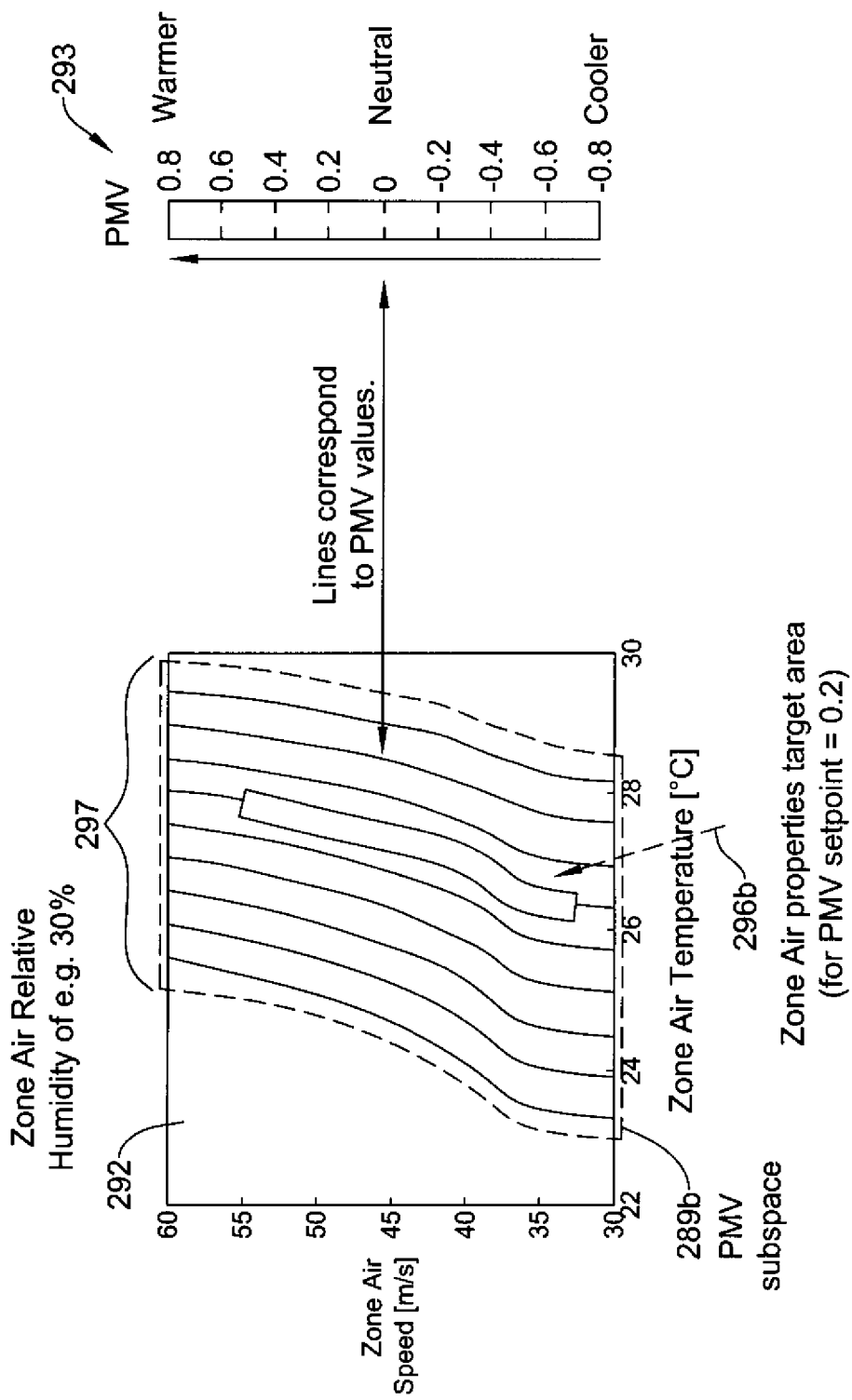
FIG. 10 is a graph indicating a speed-based strategy.

The second part of step two may be illustrated by FIGS. 9 and 10 which deal with the PMV subspace as in graph 289 which is of output 290 in FIG. 8. The second part may involve the zone air properties target area, which may have various shapes. FIG. 9 is a graph 291 indicating an enthalpy-based strategy (i.e., the air speed is fixed). The air speed in this instance may be 0.1 m/s. Graph 291 may be a plot of zone relative humidity (percent) versus zone air temperature (degrees C.). Slanted vertical lines 294 may represent constant PMVs for the various plots. A value of each PMV line 294 may be determined by comparing the shade or color with a matching shade or color of a PMV scale 293. The various PMVs may instead be represented by different patterns in black and white or different kinds of lines such as dashed or dotted ones with different designs or densities having a corresponding PMV scale like that of scale 293. An area within a closed dotted line 289a may be regarded as a PMV subspace. A dark area 296a situated along a PMV line 294 may represent a zone air properties target area (i.e., for a PMV setpoint=0.4).

FIG. 10 is a graph 292 indicating a speed-based strategy (i.e., the air relative humidity is fixed). The zone relative humidity in this instance may be 30 percent. Graph 292 may be a plot of air speed (m/s) versus zone air temperature (degrees C.). There appear slanted vertical lines 297 of which each may represent a particular PMV for various plots of values. A value of each PMV line 297 may be determined by comparing the shade or color with a matching shade or color of the PMV scale 293. An area within a closed dotted line 289b may be regarded as a PMV subspace. A dark area 296b may represent a zone air properties target area (i.e., for a PMV setpoint=0.2).

Figure 11:
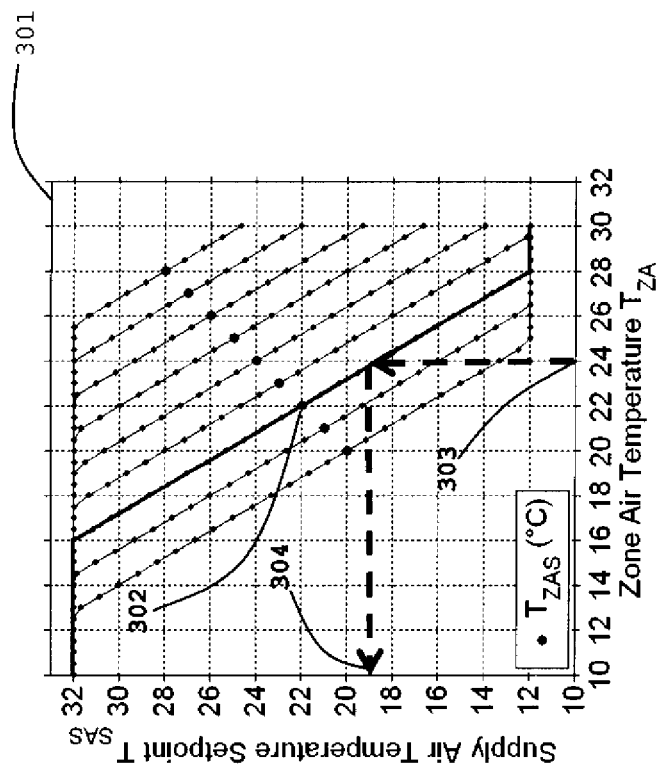
FIG. 11 shows a graph of supply air temperature setpoint versus zone air temperature which may indicate a supply air temperature setpoint based on zone air temperature and a zone air temperature setpoint.

A first part of the third step may involve a supply air temperature reset. Supply air setpoints are not necessarily identical to zone setpoints. This difference may reflect building dynamics, internal heat gain and/or outdoor conditions (e.g., air temperature and air relative humidity). It may reflect other items. FIG. 11 shows a graph 301 of supply air temperature setpoint ($T_{SAS}$) versus zone air temperature $T_{ZA}$, which may indicate a supply air temperature reset based on zone air temperature (degrees C.) and a zone air temperature setpoint (degrees C.). For instance, if a zone setpoint 302 (a bold dot) is 22 degrees C. and the zone air temperature 303 is 24 degrees C., then the supply air temperature setpoint 304 may be set to 19 degrees C. (i.e., reset).

Figure 12:
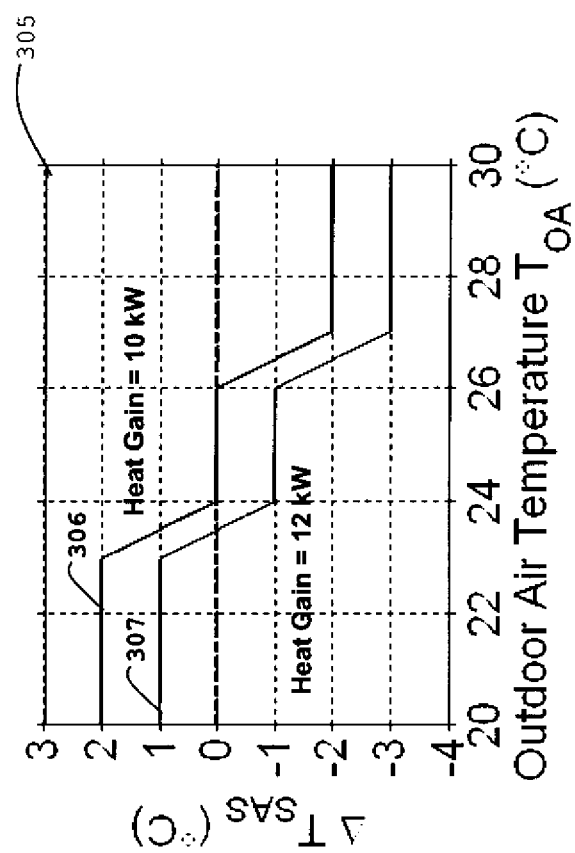
FIG. 12 shows a graph of a supply air temperature correction based on an outdoor air temperature and internal heat gain (W)

FIG. 12 is a graph 305 which may also relate to the first part of the third step. A supply air temperature setpoint correction may be based on an outdoor air temperature (degrees C.) and/or internal heat gain (W). The graph 305 shows supply air temperature setpoint correction ($\Delta T_{SAS}$ degrees C.) versus outdoor air temperature ($T_{OA}$ degrees C.). For an example heat gain of 10 kW as indicated by plot 306 at an outdoor temperature of, for instance 23 degrees C., then the $\Delta T_{SAS}$ should be +2 degrees C. For an example heat gain of 12 kW as indicated by plot 307 at an outdoor temperature of 24 degrees C., then the $\Delta T_{SAS}$ should be −1 degree C. It may be noted that for greater heat gain at a given $T_{OA}$, the $\Delta T_{SAS}$ may be less.

Figure 13:
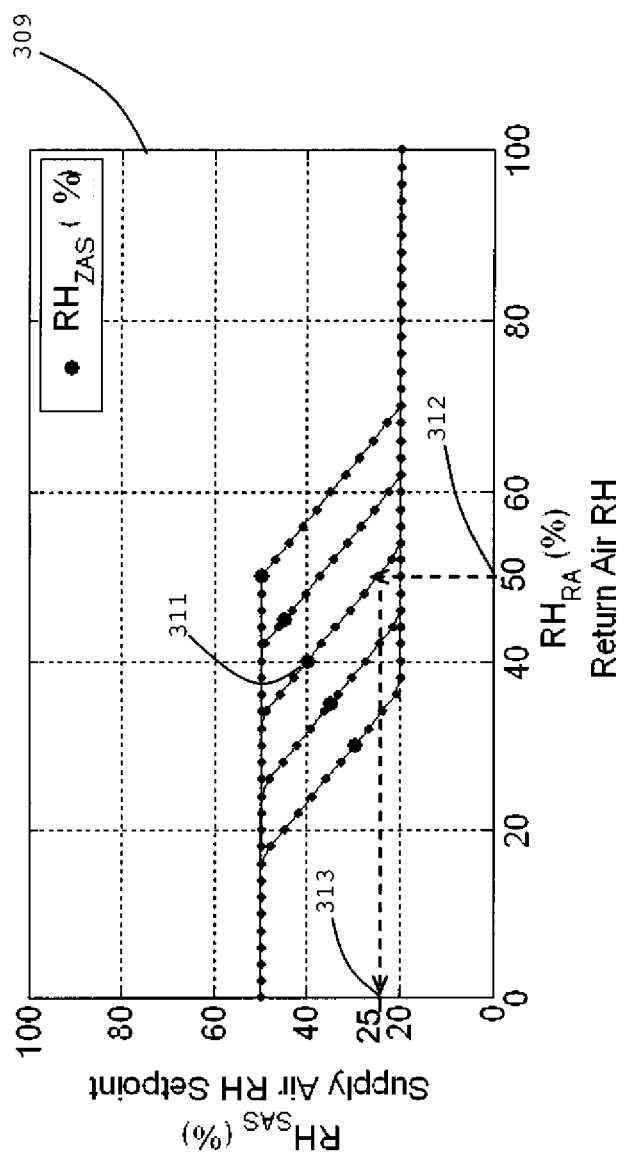
FIG. 13 shows a graph which relates to defining an area for setpoint optimization, such as for instance, a supply air humidity reset.

FIG. 13 is a graph 309 which may relate to a second part of the third step of the present approach for defining an area for setpoint optimization, such as a supply air humidity reset. Graph 309 may be laid out with supply air relative humidity setpoint ($RH_{SAS}$ percent) versus return air relative humidity ($RH_{RA}$ percent). If the zone relative humidity setpoint 311 is 40 percent and the return air humidity 312 is about 50 percent, then the supply air relative humidity setpoint 313 should be about 25 percent.

Figure 14:
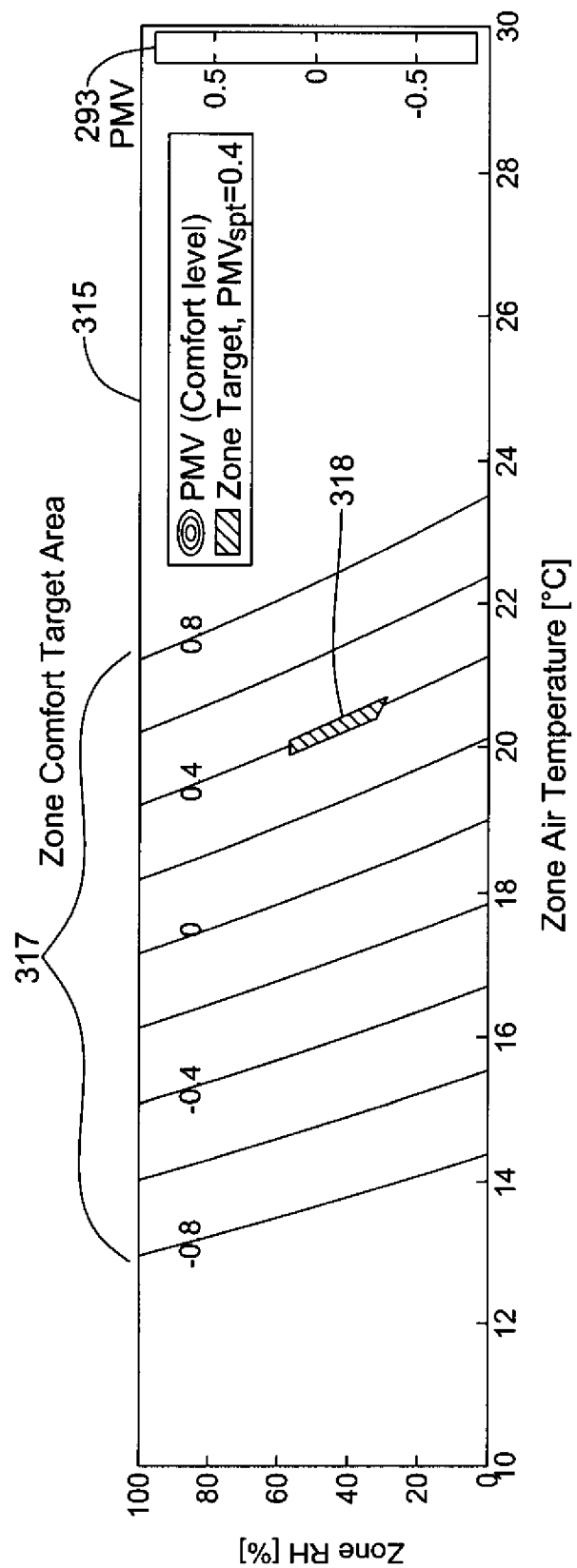
FIGS. 14 and 15 illustrate an example transformation a zone air properties target area to a supply air properties target area.

Step three may be a transformation of a zone air properties target area to a supply air properties target area. Graphs 315 and 316 of FIGS. 14 and 15, respectively, illustrate this example transformation. The PMV may be computed using room-specific parameters (i.e., clothing level and metabolic activity). Graph 315 may represent a zone air properties target area, that is, a zone thermal comfort target area. Graph 315 may be laid out with zone relative humidity (percent) versus zone air temperature (degrees C.) with slanted lines 294 representing PMVs of various values of −0.8, −0.6, −0.4, −2.0, 0, 0.2, 0.4, 0.6 and 0.8, which may also be indicated with comparison of the respective line 294 having a shade or color match relative to a PMV scale 293 for the zone thermal comfort target area. Symbol 318 may represent a zone target for a PMV setpoint=0.4. The legend "Zone target" in FIG. 14 represents the zone air properties target area.

Figure 15:
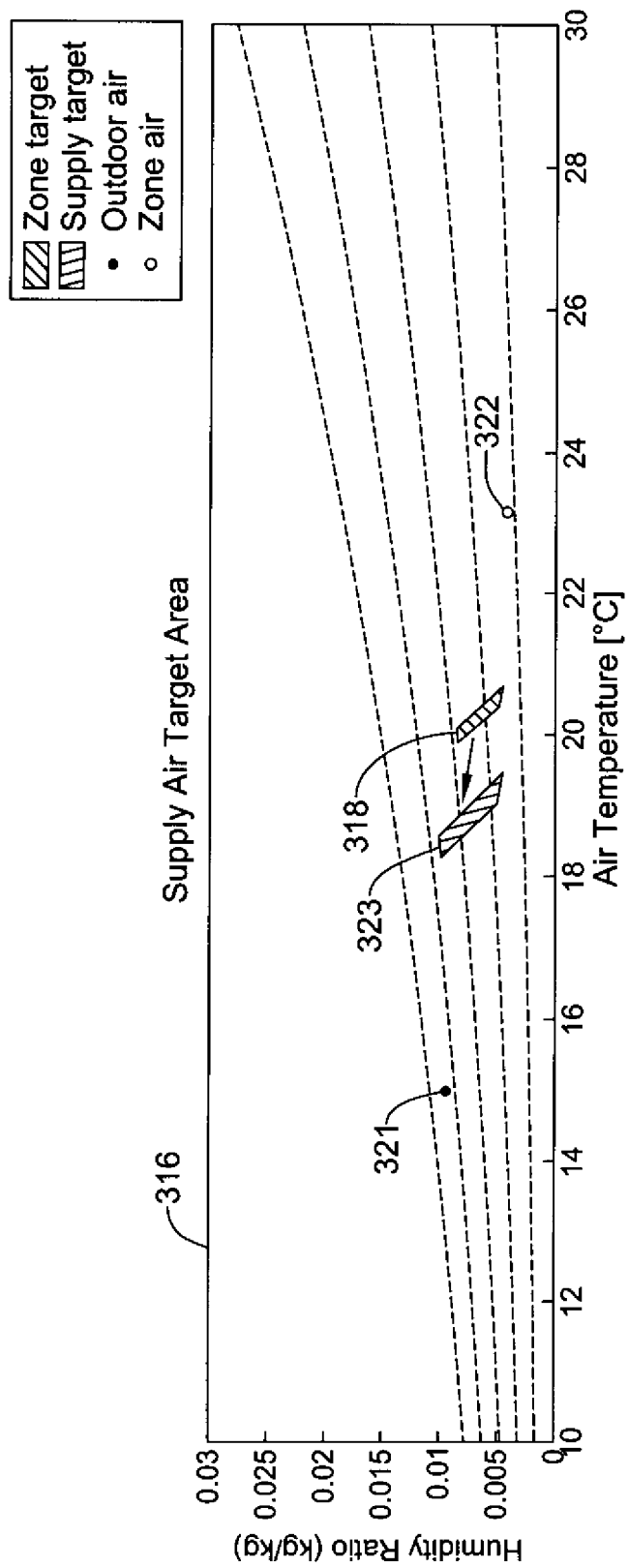

Graph 316 of FIG. 15, containing a psychrometric chart, may represent a supply air properties target area. Graph 316 shows a humidity ratio ($kg_{water}/kg_{dry\,air}$) versus air temperature (degrees C.). Dot 321 may represent outdoor air and dot 322 may represent zone air. Zone target 318 may be transformed into a supply target 323 by a temperature and relative humidity reset. The legend "Zone target" represents the zone air properties target area, and the legend "Supply target" represents the supply air properties target area.

A final output may be the supply air properties target area 323. The supply air properties target area 323 may be computed by the present approach. The supply air properties target area 323 may define boundaries for setpoint optimization. A search for optimal supply air setpoints may be performed inside area 323.

Figure 16:
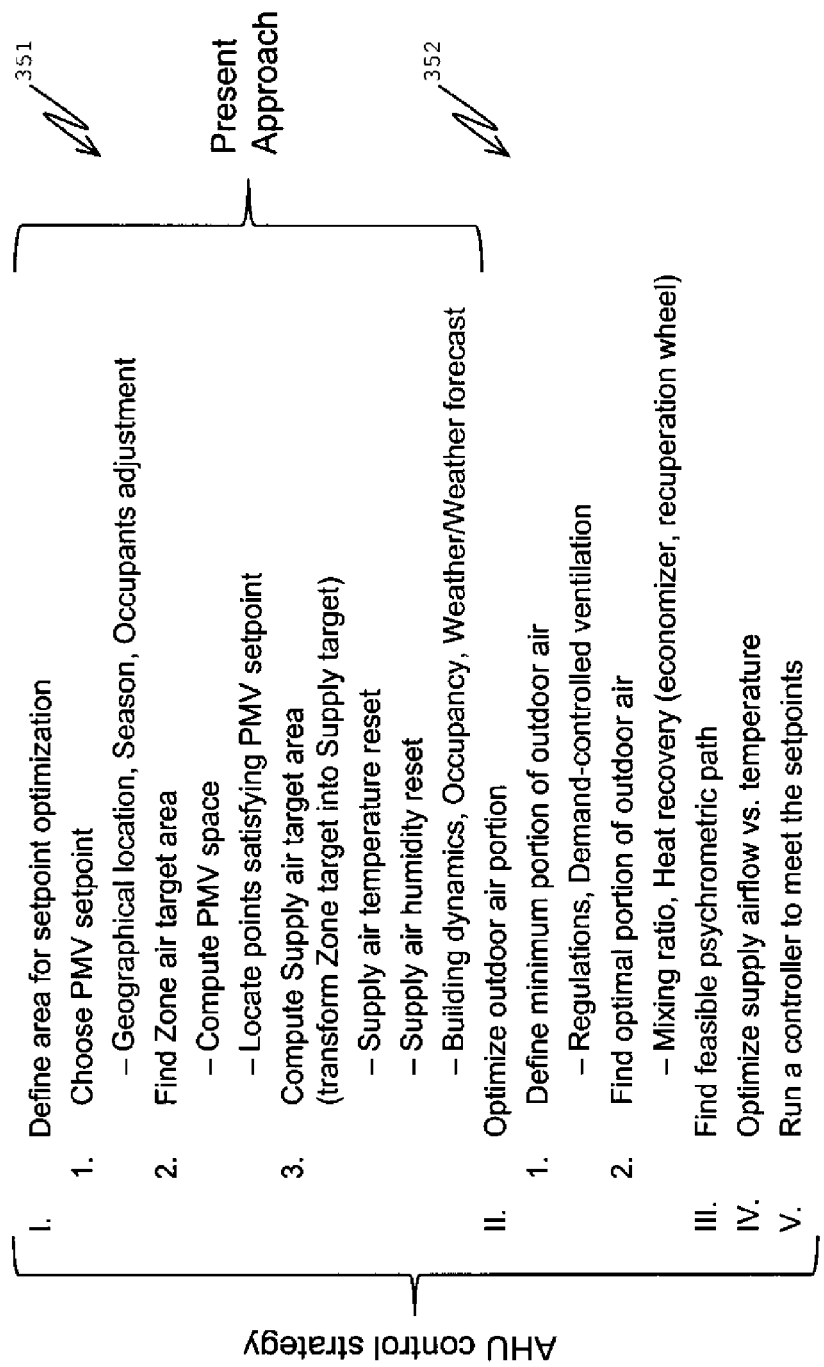
FIG. 16 is a diagram indicating AHU control strategy.

FIG. 16 is a diagram of part 351 and 352 containing AHU control strategy. Part 351 may incorporate algorithmic steps for an AHU setpoint optimization. Even though a step refers to the PMV, it may instead be stated in a context of another thermal comfort index. The present approach may be indicated by step I, which includes sub-steps 1-3. Step I may be defining an area for setpoint optimization. Sub-step 1 may be choosing a PMV setpoint, which may incorporate geographical location, season, occupant's adjustment (e.g., PMV offset), and so on. Sub-step 2 may be finding a zone air properties target area, which may incorporate computing PMV space, locating points satisfying the PMV setpoint, and so on. Sub-step 3 may be computing a supply air properties target area (e.g., transforming a zone target into a supply target). Portions of sub-step 3 may incorporate a supply air temperature reset, a supply air humidity reset, and building dynamics, occupancy, weather/weather forecast, and so on.

In part 352, the diagram shows a step II, optimizing an outdoor portion, which may incorporate a sub-step 1 of defining a minimum outdoor portion of outdoor air, in conjunction with regulations, demand-controlled ventilation, and so on. Step II may also incorporate a sub-step 2 of finding an optimal portion of outdoor air, in conjunction with a mixing ratio, heat recovery (economizer, recuperation wheel), and so on. Step III may incorporate finding a feasible psychrometric path. Step IV may incorporate optimizing supply airflow versus temperature, and step V may incorporate running a controller to meet the setpoints.

Figure 17:
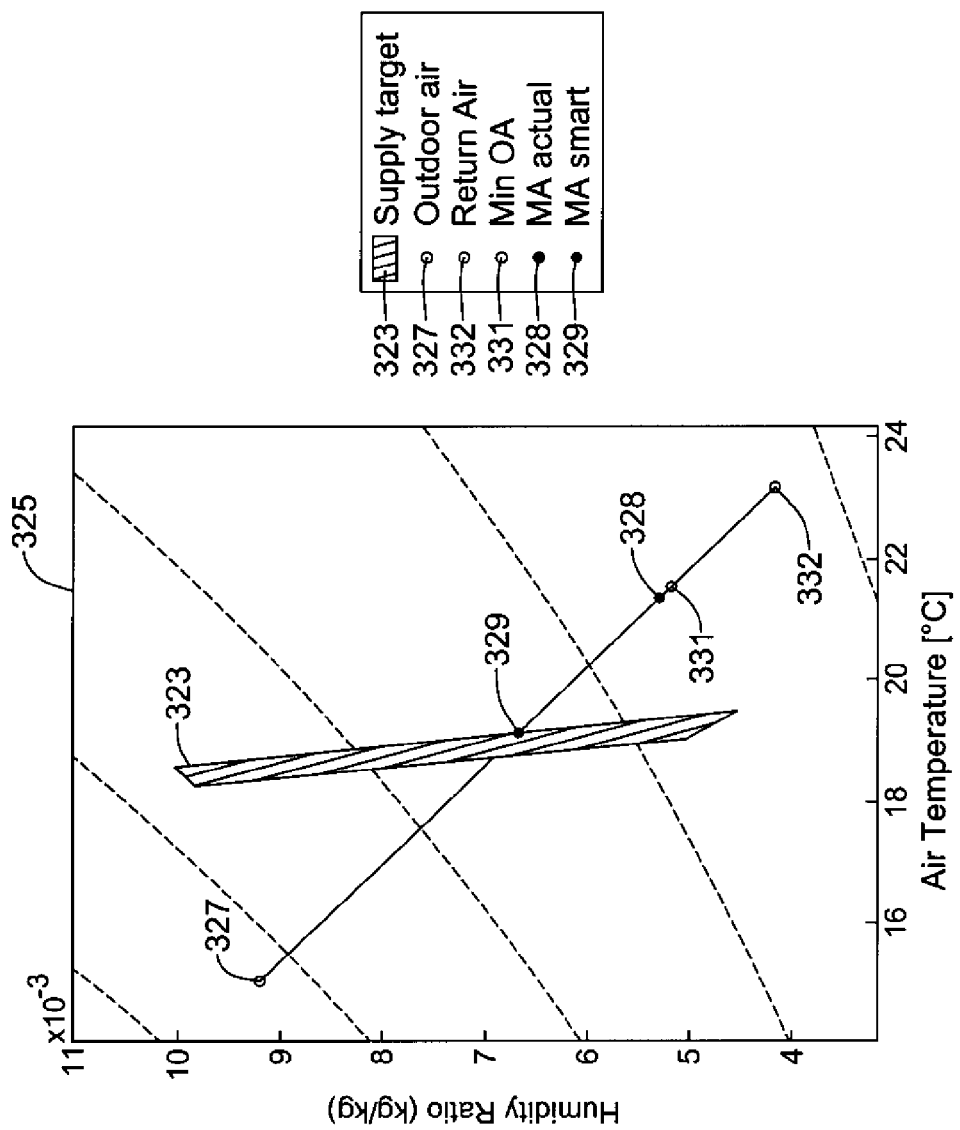
FIG. 17 shows a graph of humidity ratio versus air temperature for optimizing an outdoor air portion in order to reach a supply air properties target area with virtually minimal energy requirements.

FIG. 17 shows a graph 325 with a humidity ratio ($kg_{water}/kg_{dry\,air}$) versus air temperature (degrees C.). Graph 325 may relate to a step II of optimizing an outdoor air portion. Dot 327 represents the current outdoor air (OA) properties. Dot 328 represents the current mixed air (MA) properties obtained using a standard control strategy. Dot 329 represents the current MA properties obtained using the control strategy of the present approach. Dot 331 may represent outdoor air (OA) properties corresponding to a minimal flow of outdoor air as required by regulations. Dot 332 represents the return air properties. An optimal portion of outdoor air may be represented by an area about dot 329. Some of the legends may be noted. "Supply Target" may represent the supply air properties target area. "Min OA" may represent outdoor air (OA) properties corresponding to a minimal flow of outdoor air as required by regulations. "MA actual" may represent the current mixed air (MA) properties obtained using a standard control strategy. "MA smart" may represent current MA properties obtained using the control strategy of the present approach.

Figure 18:
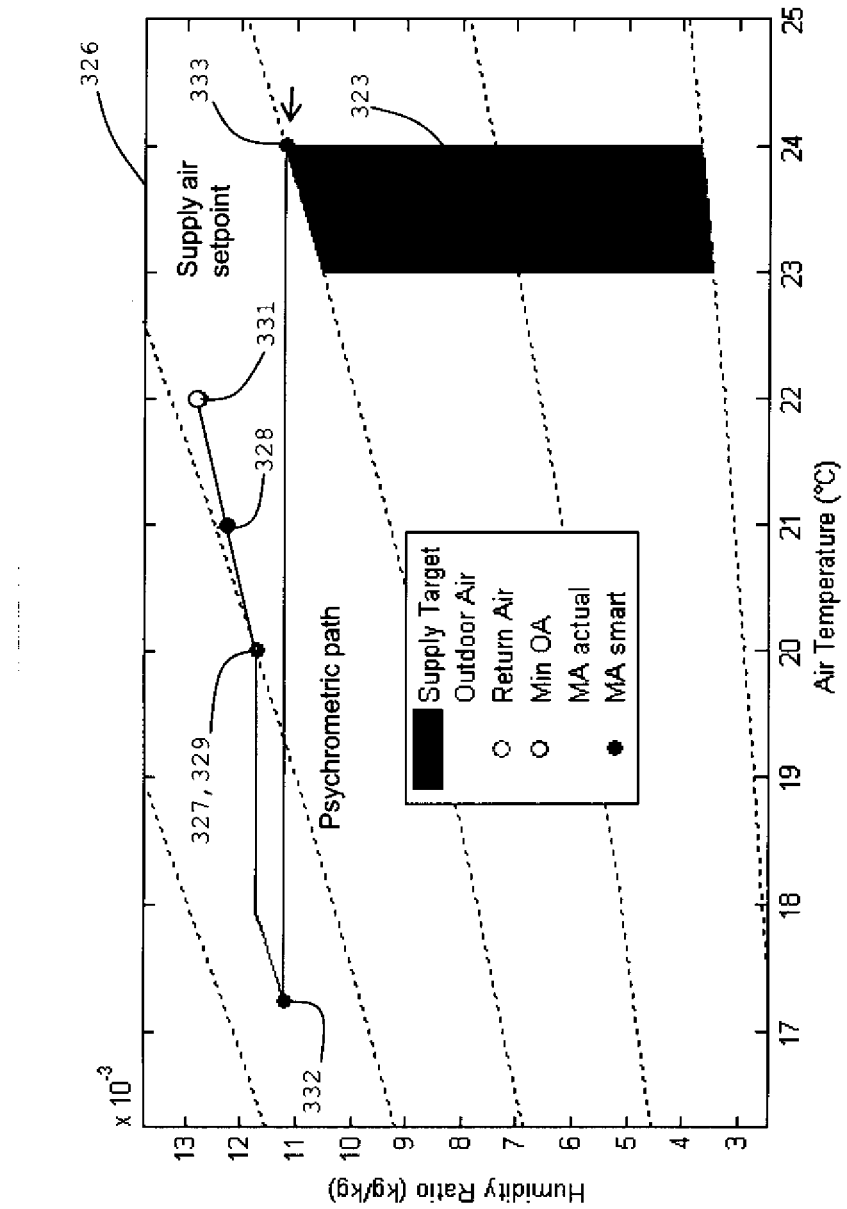
FIG. 18 shows a graph of humidity ratio versus air temperature relating to finding a feasible psychrometric path relative to a supply air properties target area.

FIG. 18 shows a graph 326 which may relate to a step III of finding a feasible psychrometric path relative to the supply air target area 323. Graph 326 may be laid out with humidity ratio ($kg_{water}/kg_{dry\ air}$) versus air temperature (degrees C.). The psychrometric path may include a min OA dot 331, an MA standard dot 328, an outdoor air dot 327 and an MA smart dot 329, a return air dot 332, and a supply air setpoint dot 333 at the supply air target area 323. Some of the legends may be noted. "Supply Target" represents the supply air properties target area. "Min OA" may represent outdoor air (OA) properties corresponding to a minimal flow of outdoor air as required by regulations. "MA actual" may represent the current mixed air (MA) properties obtained using a standard control strategy. "MA smart" may represent current MA properties obtained using the control strategy of the present approach.

Figure 19:
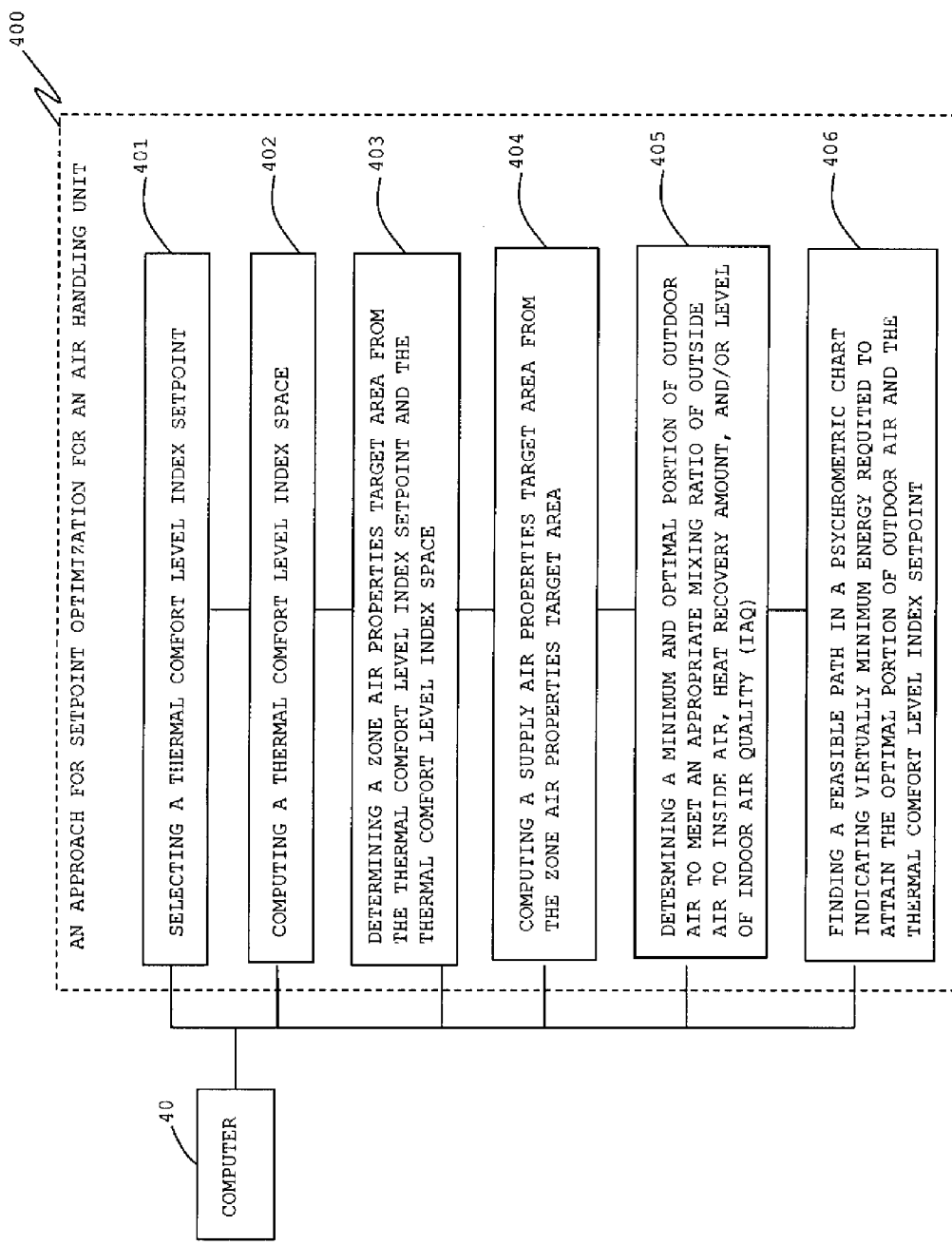
FIG. 19 is a diagram of an approach for setpoint optimization for an air handling unit.

To recap, as shown in a diagram of FIG. 19, an approach 400 for setpoint optimization for an air handling unit may incorporate at symbol 401 selecting a thermal comfort level index setpoint, at symbol 402 computing a thermal comfort level index space, at symbol 403 determining a zone air properties target area from the thermal comfort level index setpoint and the thermal comfort level index space, and at symbol 404 computing a supply air properties target area from the zone air properties target area. Each target area may incorporate a set of one or more air properties. The supply air properties target area may define boundaries for setpoint optimization. A computer 40 along with associated software may be used to effect one or more portions and/or items 401-406 of approach 400, and one or more portions and/or items pertinent to items 401-406.

The setpoint optimization may incorporate attaining the thermal comfort level index setpoint with minimal energy. A thermal comfort level index may incorporate a predicted mean vote (PMV). One or more air properties may be selected from a group consisting of air temperature, air relative humidity, air speed, and radiant temperature.

The selecting a thermal comfort level index setpoint may consider geographical location, climatic season and/or one or more occupants' inputs. The computing a thermal comfort level index space may be at least partially from a given range of zone air properties and/or occupant-related parameters. The zone air properties target area may be found as a subset of the thermal comfort level index space that has one or more points satisfying the thermal comfort level index setpoint.

The computing a supply air properties target area from the zone air properties target area, may incorporate transforming the zone air properties target area to the supply air properties target area with one or more resets. The one or more resets may incorporate a supply air temperature reset and/or a supply air humidity reset.

The transforming the zone air properties target area to the supply air properties target area, may incorporate one or more setpoint corrections based on internal heat gain, building dynamics, current outdoor air conditions, and/or forecast outdoor air conditions.

The supply air properties target area may incorporate an input for an optimization algorithm for searching supply air setpoints. The supply air setpoints may incorporate air temperature, air relative humidity and/or air speed. A supply air setpoint may be selected as a particular point from the supply air properties target area to yield a virtually maximum amount of energy savings.

The approach for setpoint optimization for an air handling unit may further incorporate at symbol 405 determining a minimum and optimal portion of outdoor air to meet an appropriate mixing ratio of outdoor air to return air, heat recovery amount, and/or level of indoor air quality (IAQ). The approach may further incorporate at symbol 406 finding a feasible path in a psychrometric chart indicating virtually minimum energy required to attain the optimal portion of outdoor air and the thermal comfort level index setpoint. The feasible path of the psychrometric chart may incorporate a start point and an end point. The start point may have the optimal portion of outdoor air, and the end point may have the supply air temperature, relative humidity and/or speed setpoint corresponding to the selected thermal comfort level index setpoint.

Figure 20:
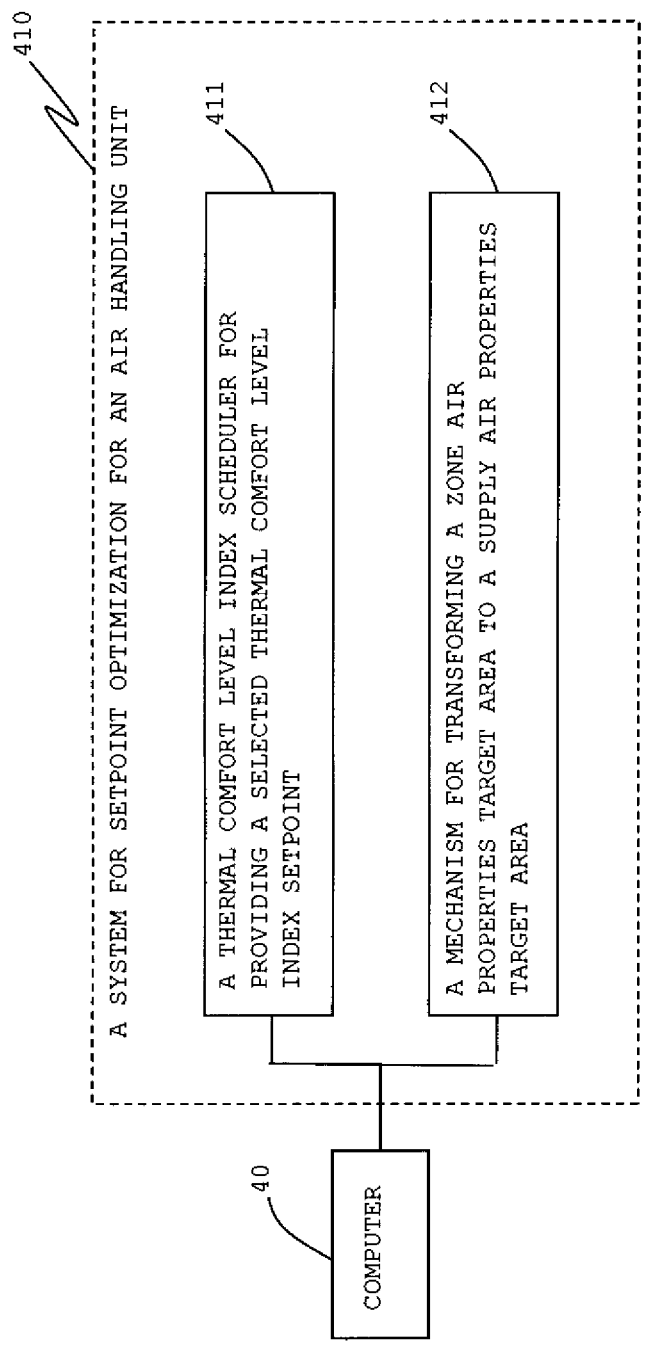
FIG. 20 is a diagram of a system for setpoint optimization for an air handling unit.

As shown in a diagram of FIG. 20, a system 410 for setpoint optimization for an air handling unit may incorporate a thermal comfort level index scheduler 411 for providing a selected thermal comfort level index setpoint, and a mechanism 412 for transforming a zone air properties target area to a supply air properties target area. The thermal comfort level index scheduler 411 may provide the thermal comfort level index setpoint to the mechanism 412. The zone air properties target area may have one or more points that satisfy the thermal comfort level index setpoint from the thermal comfort level index scheduler. A target area may incorporate a set of virtually all combinations of air properties. The air properties may incorporate one or more of a group consisting of air temperature, relative humidity, air speed, and radiant temperature. The transforming a zone air properties target area to a supply air properties target area may incorporate using one or more supply air setpoint resets which may reflect building dynamics, internal heat gain and outdoor air temperature. The thermal comfort level index may incorporate a predicted mean vote (PMV) for quantifying a thermal comfort level. A computer 40 along with associated software may be used to effect one or more portions and/or items 411 and 412 of system 410, and one or more portions and/or items pertinent to items 411 and 412.

Figure 21:
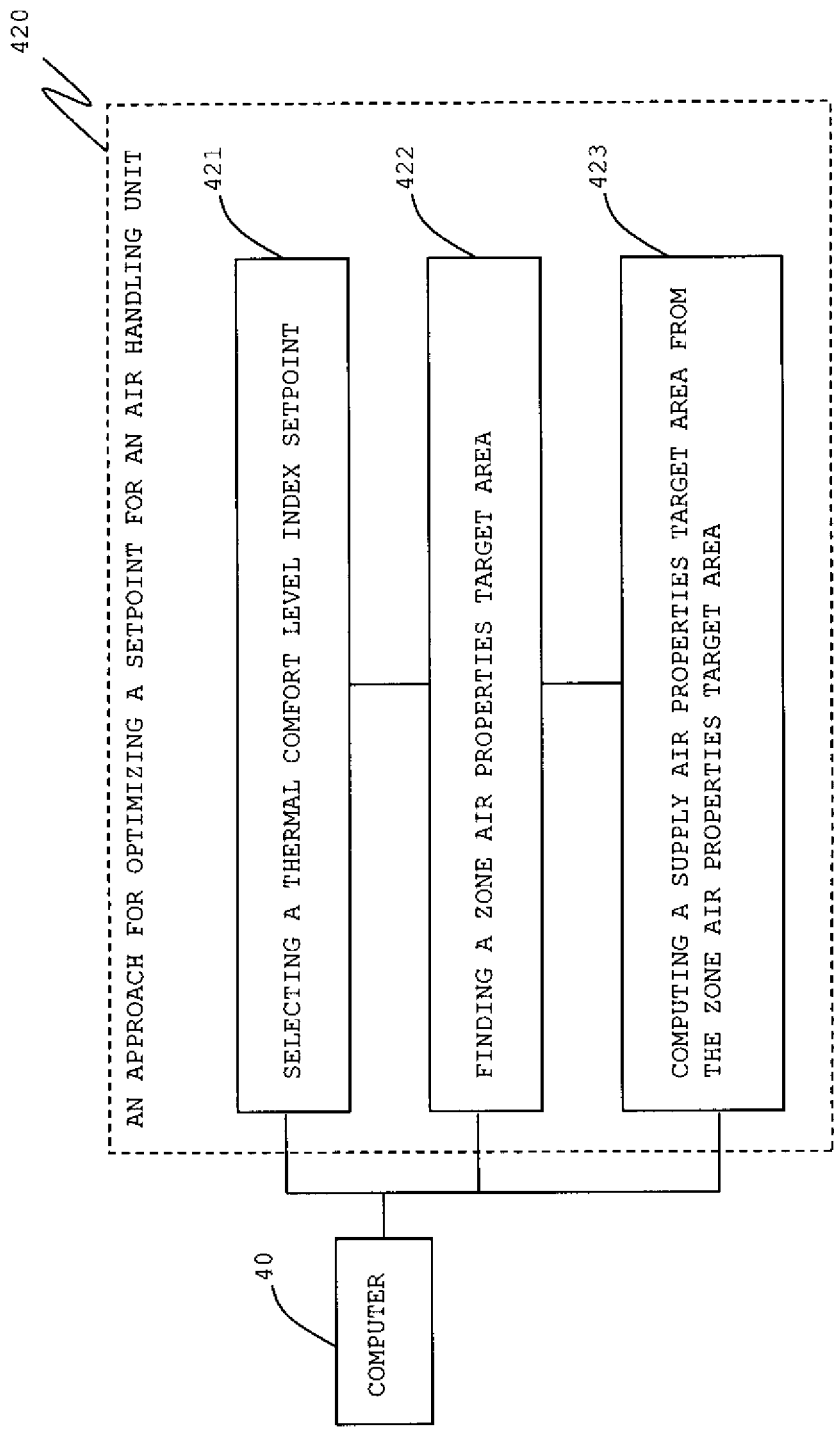
FIG. 21 is a diagram of an approach for optimizing a setpoint for an air handling unit.

As shown in a diagram of FIG. 21, an approach 420 for optimizing a setpoint for an air handling unit may incorporate at symbol 421 selecting a thermal comfort level index setpoint, at symbol 422 finding a zone air properties target area, and at symbol 423 computing a supply air properties target area from the zone air properties target area. A computer 40 along with associated software may be used to effect one or more portions and/or items 421-423 of approach 420, and one or more portions and/or items pertinent to items 421-423.

The selecting a thermal comfort level index setpoint may incorporate inputs concerning a geographical location, a climate season, and/or one or more occupant's adjustments, if any. Finding a zone air properties target area may incorporate computing a thermal comfort level index space, and locating one or more points in the thermal comfort level index space which satisfy the thermal comfort level index setpoint.

Computing the supply air properties target area may incorporate providing a supply air temperature setpoint reset from a zone air temperature and a zone air temperature setpoint, and providing a supply air relative humidity reset from a zone air relative humidity and a zone air relative humidity setpoint. The resets may reflect building dynamics, occupancy, internal heat gain, weather and/or weather forecast.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for setpoint optimization for an air handling unit comprising:
selecting a thermal comfort level index setpoint;
computing a thermal comfort level index space;
determining a zone air properties target area from the thermal comfort level index setpoint and the thermal comfort level index space; and
computing a supply air properties target area from the zone air properties target area; and
wherein:
each target area comprises a set of air properties, the set including either multiple values of a single air property, or multiple combinations of values of a plurality of air properties, each target area including virtually all values or combinations of values of air properties that will lead to satisfaction of comfort requirements as specified by the thermal comfort level index setpoint; and
the supply air properties target area defines boundaries for optimization of supply air setpoints, the supply air setpoints for controlling HVAC equipment that provides supply air.

2. The method of claim 1, wherein optimization comprises attaining the thermal comfort level index setpoint with minimal energy.

3. The method of claim 1, wherein a thermal comfort level index comprises a predicted mean vote (PMV).

4. The method of claim 1, wherein the single air property or the air properties of the plurality of air properties are selected from a group consisting of air temperature, air relative humidity, air speed and radiant temperature.

5. The method of claim 1, wherein the selecting a thermal comfort level index setpoint considers geographical location, climatic season and/or one or more occupants' inputs.

6. The method of claim 5, wherein the computing a thermal comfort level index space is at least partially from a given range of zone air properties and/or occupant-related parameters.

7. The method claim 6, wherein the zone air properties target area is found as a subset of the thermal comfort level index space that comprises one or more points satisfying the thermal comfort level index setpoint.

8. The method of claim 6, wherein the computing a supply air properties target area from the zone air properties target area, comprises transforming the zone air properties target area to the supply air properties target area with one or more resets.

9. The method of claim 8, wherein the one or more resets comprise a supply air temperature reset and/or a supply air humidity reset.

10. The method of claim 8, wherein the transforming the zone air properties target area to the supply air properties target area, comprises one or more setpoint corrections based on internal heat gain, building dynamics, current outdoor air conditions, and/or forecast outdoor air conditions.

11. The method of claim 1, wherein:
the supply air properties target area comprises an input for an optimization algorithm for searching supply air setpoints; and
the supply air setpoints comprise air temperature, air relative humidity and/or air speed.

12. The method of claim 11, wherein a supply air setpoint is selected as a particular point from the supply air properties target area to yield a virtually maximum amount of energy savings.

13. The method of claim 1, further comprising determining a minimum and optimal portion of outdoor air to meet an appropriate mixing ratio of outdoor air to return air, heat recovery amount, and/or level of indoor air quality (IAQ).

14. The method claim 13, further comprising:
finding a feasible path in a psychrometric chart indicating virtually minimum energy required to attain the optimal portion of outdoor air and the thermal comfort level index setpoint; and
wherein:
the feasible path of the psychrometric chart comprises a start point and an end point;
the start point comprises the optimal portion of outdoor air; and
the end point comprises the supply air temperature, relative humidity and/or speed setpoint corresponding to the selected thermal comfort level index setpoint.

15. A system for setpoint optimization for an air handling unit comprising:
a thermal comfort level index scheduler for providing a selected thermal comfort level index setpoint; and
a mechanism for transforming a zone air properties target area to a supply air properties target area; and
wherein:
the thermal comfort level index scheduler provides the thermal comfort level index setpoint to the mechanism;
the zone air properties target area has one or more points that satisfy the thermal comfort level index setpoint from the thermal comfort level index scheduler;
a target area comprises a set of virtually all combinations of air properties;
the air properties comprise one or more of a group consisting of air temperature, relative humidity, air speed, and radiant temperature; and
the transforming a zone air properties target area to a supply air properties target area comprises using one or more supply air setpoint resets which incorporate building dynamics, internal heat gain and outdoor air temperature.

16. The system of claim 15, wherein the thermal comfort level index comprises a predicted mean vote (PMV) for quantifying a thermal comfort level.

17. A method for optimizing a setpoint for an air handling unit, comprising:
selecting a thermal comfort level index setpoint;
finding a zone air properties target area; and
computing a supply air properties target area from the zone air properties target area.

18. The method of claim 17, wherein selecting a thermal comfort level index setpoint comprises inputs concerning a geographical location, a climate season, and/or one or more occupant's adjustments, if any.

19. The method of claim 17, wherein finding a zone air properties target area comprises:
computing a thermal comfort level index space; and
locating one or more points in the thermal comfort level index space which satisfy the thermal comfort level index setpoint.

20. The method of claim 19, wherein computing the supply air properties target area comprises:
providing a supply air temperature setpoint reset from a zone air temperature and a zone air temperature setpoint; and
providing a supply air relative humidity reset from a zone air relative humidity and a zone air relative humidity setpoint; and
wherein the resets reflect building dynamics, occupancy, internal heat gain, weather and/or weather forecast.

* * * * *